United States Patent
Mathey et al.

(10) Patent No.: US 9,423,064 B2
(45) Date of Patent: Aug. 23, 2016

(54) METHOD AND APPARATUS FOR REPAIRING MAIN AND LATERAL PIPES

(71) Applicant: LMK Technologies, LLC, Ottawa, IL (US)

(72) Inventors: Jason M. Mathey, Oglesby, IL (US); Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

(21) Appl. No.: 14/256,495

(22) Filed: Apr. 18, 2014

(65) Prior Publication Data

US 2014/0311607 A1    Oct. 23, 2014

Related U.S. Application Data

(60) Provisional application No. 61/813,254, filed on Apr. 18, 2013.

(51) Int. Cl.

| | |
|---|---|
| *F16L 55/18* | (2006.01) |
| *B29C 63/36* | (2006.01) |
| *F16L 55/165* | (2006.01) |
| *F16L 55/179* | (2006.01) |
| *E03F 3/06* | (2006.01) |

(52) U.S. Cl.
CPC ............... *F16L 55/18* (2013.01); *B29C 63/36* (2013.01); *F16L 55/1651* (2013.01); *F16L 55/179* (2013.01); *E03F 2003/065* (2013.01)

(58) Field of Classification Search
CPC .... F16L 55/18; F16L 55/179; F16L 55/1651
USPC .................................................. 138/97, 98
See application file for complete search history.

(56) References Cited

U.S. PATENT DOCUMENTS

| | | | |
|---|---|---|---|
| 5,794,663 A | 8/1998 | Kiest, Jr. et al. | |
| 5,950,682 A * | 9/1999 | Kiest, Jr. ..................... | 138/98 |
| 5,964,249 A * | 10/1999 | Kiest, Jr. ..................... | 138/98 |

(Continued)

FOREIGN PATENT DOCUMENTS

| | | |
|---|---|---|
| EP | 1447610 | 8/2004 |
| EP | 1447610 A1 | 8/2004 |

(Continued)

OTHER PUBLICATIONS

JP 1-258938, Ashimori Ind Co Ltd—English Abstract. Oct. 16, 1989.

(Continued)

*Primary Examiner* — Paul R Durand
*Assistant Examiner* — Vishal Pancholi
(74) *Attorney, Agent, or Firm* — Nyemaster Goode, P.C.

(57) ABSTRACT

A method and apparatus for repairing a pipe system including a main pipe extending between a first and second manhole and one or more lateral pipes extending from the main pipe is provided. Aspects of the invention include the use of a main liner member having a plurality of lateral liner tubes in fluid connection and extending from the main liner member. The main liner member is used to line a main pipe, while the multiple lateral liner tubes extend into separate lateral pipes extending in various orientations from the main pipe. This method and apparatus provides for a single assembly to be able to line multiple pipes, which reduces time and cost for pipe repair.

20 Claims, 17 Drawing Sheets

(56) References Cited

U.S. PATENT DOCUMENTS

| | | | |
|---|---|---|---|
| 6,021,815 A * | 2/2000 | Kiest et al. | 138/98 |
| 6,039,079 A | 3/2000 | Kiest, Jr. | |
| 6,337,114 B1 | 1/2002 | Wood | |
| 6,899,832 B2 | 5/2005 | Wood | |
| 7,628,177 B2 * | 12/2009 | Lepola | 138/98 |
| 2007/0240779 A1 * | 10/2007 | Kamiyama et al. | 138/98 |
| 2009/0041546 A1 | 2/2009 | Kiest, Jr. | |
| 2010/0301505 A1 | 12/2010 | Kiest, Jr. | |
| 2012/0175004 A1 | 7/2012 | Kiest, Jr. | |
| 2013/0019983 A1 * | 1/2013 | Kiest, Jr. | 138/98 |
| 2013/0081732 A1 | 4/2013 | Kiest, Jr. | |

FOREIGN PATENT DOCUMENTS

| | | |
|---|---|---|
| JP | 1258938 | 10/1989 |
| JP | HO1258938 A | 10/1989 |

OTHER PUBLICATIONS

LMK Technologies, LLC, PCT/US2014/034666 filed Apr. 18, 2014, "The International Search Report and the Written Opinion of the International Searching Authority, or the Declaration", mailed Aug. 13, 2014.

International Preliminary Report on Patenability (Chapter I of the Patent Cooperation Treaty). PCTUS2014034666 International filing date: Apr. 18, 2014.

\* cited by examiner

METHOD AND APPARATUS FOR REPAIRING MAIN AND LATERAL PIPES

CROSS-REFERENCE TO RELATED APPLICATIONS

This application claims priority under 35 U.S.C. §119 to provisional application Ser. No. 61/813,254, filed Apr. 18, 2013, which is hereby incorporated by reference in its entirety.

FIELD OF THE INVENTION

The invention relates generally to pipe repair. More particularly, but not exclusively, the invention relates to a method and apparatus for repairing one or more lateral pipes at the same time as repairing a main pipe that the lateral pipes extend from.

BACKGROUND OF THE INVENTION

One method of repairing the junction between main and lateral sewer pipelines is shown in U.S. Pat. No. 6,039,079, which is hereby incorporated in its entirety. A liner assembly, as shown in FIG. 3 of the '079 patent, includes a lateral liner 26 connected to a flat sheet liner 28. Both liners 26, 28 are formed of felt or other resin absorbent material. The resin is absorbed into both liners in an uncured state and the liners are held in place in the host pipelines as the resin is cured and hardened to form a hardened liner.

However, it is the general case that the main pipe extends between two service pipes or access shafts, which may be manholes. The main pipe extending between two manholes may include multiple lateral pipes extending therefrom. Furthermore, the lateral pipes may extend at different angles, both in relation to the radial configuration of the main pipe and to the angle between the axis of the main pipe and the axis of the lateral pipe. The plurality of lateral pipes extending from the same circumferential ring on the main pipe can make it more difficult to repair both the main and lateral pipes.

For example, as disclosed in U.S. Pat. No. 6,337,114, it has been the case where each lateral pipe is lined from the main pipe, and then the main pipe is lined. In order to do this, a portion of the main pipe is repaired at the junction between the main and lateral pipes. Therefore, the portion of the pipe is essentially double lined, first, by the repair of the lateral pipe, and then by the main pipe repair. The additional layers of pipe repairing liner can create obstructions in the main pipe. Obstructions are unwanted in pipes such as these, as they can reduce cross section of the pipe and may inhibit the flow.

In addition, the time and expense associated with lining the lateral pipes separately, and then lining the main pipe, is great. It takes a rather long time for resin impregnated into the repair liners to cure. A repair crew has to wait until the previous repairs have cured and hardened prior to moving on to the next repair. This can cause days' worth of delays when repairing the pipes. The delays and the amount of repair material needed to repair the main and lateral pipes increases the cost of the repairs as well, for both the repair crew and the municipality or organization paying for the repair.

Therefore, there is a need in the art for a method and apparatus for repairing main and lateral pipes that allows a repair crew to repair one or more lateral pipes extending from a main pipe at the same time of repairing the main pipe.

SUMMARY OF THE INVENTION

It is therefore a primary object, feature, and/or advantage of the present invention to overcome the deficiencies in the art.

It is another object, feature, and/or advantage of the invention to provide apparatus, methods, and/or systems for repairing a pipe system.

It is yet another object, feature, and/or advantage of the invention to provide a system, method, and/or apparatus for lining a plurality of lateral pipes.

It is still another object, feature, and/or advantage of the invention to provide a method of repairing pipes including a main pipe extending between a first and second manhole and one or more lateral pipes extending from the main pipe.

It is a further object, feature, and/or advantage of the invention to provide a repair assembly for repairing at least a portion of a main pipe between a first and second manhole, as well as one or more lateral pipes extending from the main pipe.

It is yet a further object, feature, and/or advantage of the invention to provide a liner assembly comprising a main liner member and one or more lateral liner tubes extending from the main liner member, the liner assembly capable of everting from within the main bladder tube.

It is still a further object, feature, and/or advantage of the invention to provide a bladder assembly comprising a main bladder tube and one or more lateral bladder tubes extending from the main bladder tube to coincide with the one or more lateral pipes, with the one or more lateral bladder tubes capable of everting from a position at least partially within the main bladder to a position at least partially outside the main bladder.

These and/or other objects, features, and advantages of the present invention will be apparent to those skilled in the art. The present invention is not to be limited to or by these objects, features and advantages. No single embodiment need provide each and every object, feature, or advantage.

Accordingly, exemplary aspects of the invention provide for the repair of a main pipe extending between service pipes, which may be upstream and downstream manholes. The main pipe includes one or more lateral pipes extending at various angles therefrom. The invention includes a repair assembly capable of repairing a portion of the main pipe along with one or more lateral pipes at the same time. The repair assembly includes both a bladder assembly and a liner assembly.

The bladder assembly includes a main bladder tube and one or more lateral bladder tubes extending therefrom. The bladder assembly comprises a material that can be inflated with a fluid to expand the main and lateral bladders to a diameter substantially equal to the diameters of the main and lateral pipes. The liner assembly includes a main liner member and one or more lateral liner tubes. The liners comprise a resin impregnable material, such as felt or the like, and they are impregnated with a resinous material capable of curing and hardening. Furthermore, the liners may be sized to approximately the size of the pipes to be repaired, or else may be stretchable such that one size of liner is used for different sized pipes to be repaired.

The liners, either before or after impregnation with the material, are operatively connected to the bladder assembly. The liners are inverted to a position generally within the main and lateral bladders, with the main liner frangibly attached to the main bladder to better hold them together prior to insertion into the pipe. The assembly is then connected to a fluid source, either directly by the bladder, or via a lay flat hose launcher device.

The assembly is then positioned and/or inserted in an upstream manhole and moved through the pipeline to a specified location. Fluid is added from the fluid source to inflate and/or expand the bladders. The fluid causes the liner and bladder assembly to be inverted through the main pipe such that the main liner member moves from a position generally within the main bladder to a position between the main bladder and the wall of the main pipe, with the main bladder pressing the main liner against the wall. The one or more lateral bladders and liners are positioned such that they will also invert from within the main bladder and liner at the location of the one or more lateral pipes extending from the main pipe. The lateral bladder and liner will extend into the lateral pipe, with the lateral liner tube moving from a position generally within the lateral bladder to a position between the lateral bladder tube and the lateral pipe.

The fluid pressure is maintained until the main bladder and liner have reached their end point, and the included number of lateral pipes has been repaired. The pressure is also maintained until the resinous material of the liner assembly has cured and hardened. The bladders can be removed from the main and lateral pipes, leaving repaired pipes.

The invention also contemplates that the full main pipe, including all of the lateral pipes extending therefrom, from the first manhole to the second manhole, be repaired using the method and apparatus described. Thus, the invention is not to be limited to the exact configurations shown and described below, and may include any number of lateral bladders and liners as needed per pipe configuration.

Additional steps and elements may be included to aid in aligning the lateral liners/bladders with the lateral pipes as the assembly is inflated through the pipes. A robot may be introduced from the downstream manhole and configured with a camera and a positioning device. The camera will allow an operator to view the orientation of the bladder and liner assemblies as the system inflates through the main pipe. If the robot camera reveals that the assembly needs re-oriented, e.g., rotated, the robot can attach the positioning device to the everting face of the main bladder/liner while the fluid is momentarily paused, and the assembly can be rotated as needed.

Furthermore, the assembly can include a mark along the length of the main bladder/liner to use as a reference point at the point of eversion. A positioning member can be attached to the lay flat hose-launching device or the assembly itself to selectively rotate the assembly as needed during the introduction of the fluid in the assembly. This can be air driven or mechanical to rotate the assembly as the fluid is added to maintain the positioning of the reference marker.

Figure 1:
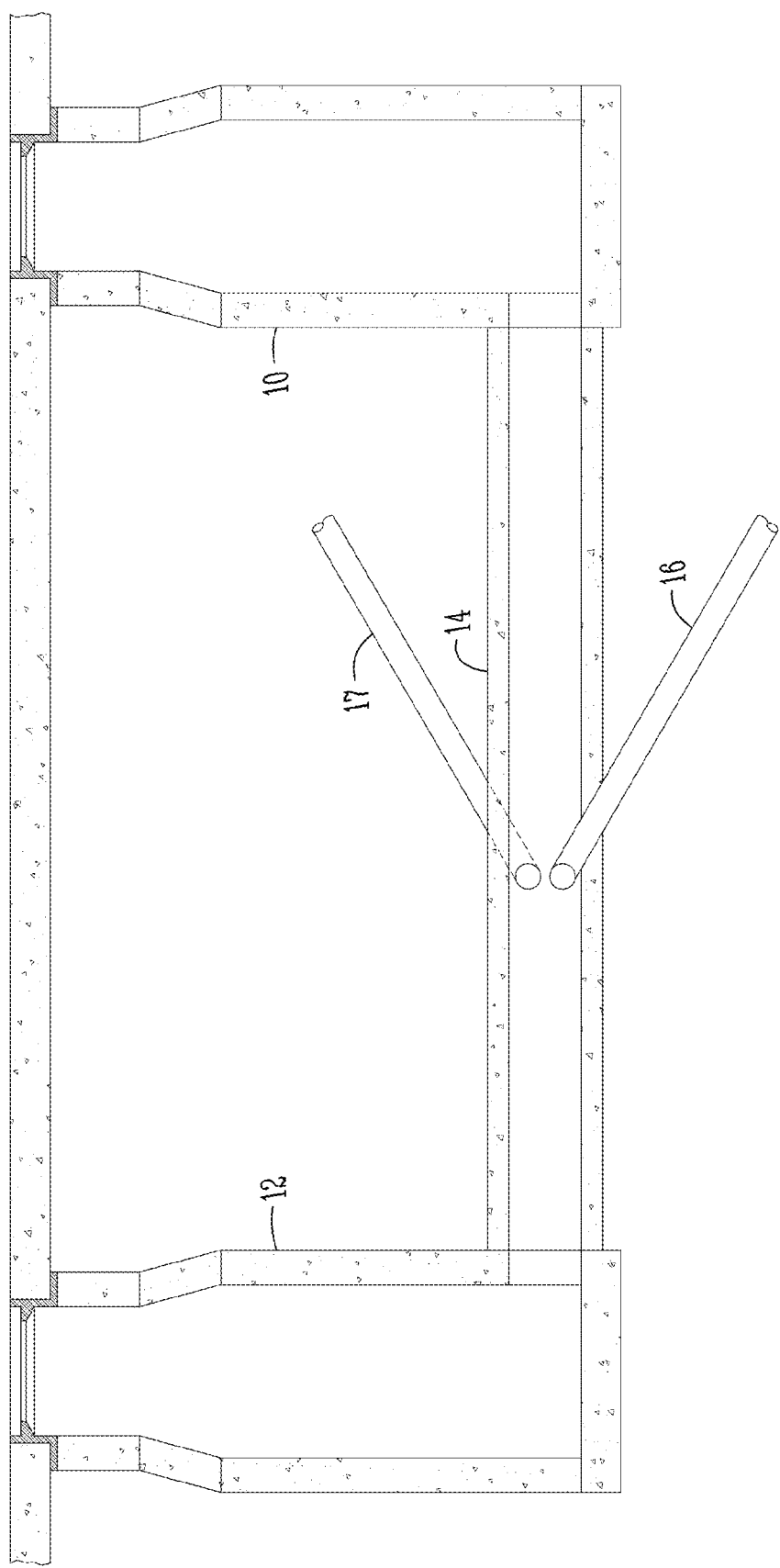
FIG. 1 is a schematic of a pipe system to be repaired by aspects of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 is a schematic of an exemplary embodiment of a pipe system in need of repair. The present invention provides for methods and apparatuses for repairing such a system. The system shown in FIG. 1 includes manholes, which are depicted as a first manhole 10 and a second manhole 12. The first manhole 10 may also be referred to as an upstream manhole, while the second manhole 12 may also be referred to as a downstream manhole. Extending between the first and second manholes 10, 12 is a main pipe 14. Furthermore, a plurality of lateral pipes, depicted as numerals 16 and 17, extend from the main pipe 14. It is noted that the lateral pipes extend in various directions relative to both the radial configuration and angular configuration of the main pipe. For example, the radial configuration of the lateral pipes extending from the main pipe 14 may be referred to as the position of the lateral pipes when viewing a cross-section of the main pipe 14 and looking along the axis of the main pipe 14. Thus, as shown in FIG. 1, the lateral pipes 16, 17 may extend from generally the same circular area along the main pipe 14 at different clock positions. Some clock positions for lateral pipes may be at 1:30 and 9:00, or even directly or approximately opposite one another at a location of the main pipe 14. However, the exact positioning, as well as the number, of the lateral pipes is not to be limiting to the present invention. The angular position or configuration of the lateral pipes may be referred to as the angle between the axis of the main pipe 14 and the axis of the lateral pipe extending therefrom. For example, the lateral pipes 16, 17, while being similar in the plane of the main pipe, extend at different obtuse angles to the main pipe 14. This may be referred to as wye-shaped or wye-configured pipes. Additional or alternative lateral pipes may include an axis that extends generally orthogonal to the axis of the main pipe 14. This is generally referred to as a tee-shaped lateral pipe configuration.

It should also be noted and appreciated that the present invention provides for the repair of a pipe system including only one lateral pipe extending from the main pipe. In such a system, the present invention will provide for repair of the main pipe and the one lateral pipe during the same repair process, and not separately, as has been the case. For example, the lateral pipe can be repaired as the main pipe is being lined by a liner that is everted through the main pipe.

The present invention contemplates that the methods and assemblies, as will be shown and described, can be used to repair generally any configuration of radial and angular configuration of one or more lateral pipes, as well as being able to repair the one or more lateral pipes during repair of the main pipe 14. As will be understood, at least some embodiments of the present invention contemplate that the entire length of the main pipe 14 extending between the first manhole 10 and the second manhole 12 may be repaired at one time, while also repairing each and every one of the lateral pipes 16, 17 at the same time and/or using the same assembly. Alternatively, some embodiments of the present invention contemplate that only a partial section of the main pipe 14 extending between the first manhole 10 and the second manhole 12 may be repaired at one time, while also repairing one or more of the lateral pipes 16, 17 at the same time.

The lining of the main pipe 14 and one or more lateral pipes during an eversion or inversion process provides numerous benefits over the prior art. For example, the lining of one or more lateral pipes along with the main pipe using a single assembly will reduce the time and expense for repairing the pipes such that more pipes can be repaired within an amount of time for a resinous material to cure and harden. Previously, each lateral pipe had to be repaired independently, and only before or after the main pipe had been lined, which greatly increased the amount of time and the cost of repairing the pipe system. Furthermore, the use of a single assembly to repair the main pipe as well as one or more lateral pipes extending therefrom will reduce the likelihood of obstructions in the pipe resulting from the overlap of multiple layers of liners used to repair walls of the main and lateral pipes. For example, it has been known to repair the lateral pipes including a portion of the main pipe being repaired as well using a resin impregnated liner. Once the lateral pipes had been repaired, the main pipe would receive a separate resin impregnated liner, which would overlap the portions of the main pipe that were repaired during repair of the lateral pipes. At this location, the multiple layers of liner could reduce the diameter of the pipes such that obstructions may be formed. This could cause blockages in the pipe system, which would need to be cleaned out. The present invention contemplates the reduction of such obstructions such that the substantially full diameter of the main and lateral pipes will be open for passage of any refuse therethrough.

FIGS. 2-15 show aspects of the invention. It should be noted that the figures are not an exhaustive list of all possible variations of said methods and means of repairing a main pipe and one or more lateral pipes extending therefrom, and are shown for exemplary purposes. As will be understood, many variations, substitutions, and alternatives may be included. For example, while many of the aspects shown include repair for two lateral pipes, it is to be understood that the present invention contemplates the repair of any number of lateral pipes extending from a main pipe such that the assembly 20 can be used to repair one or more lateral pipes along with the repair of the main pipe as a main liner is everted or otherwise inverted through a main pipe.

Figure 2:
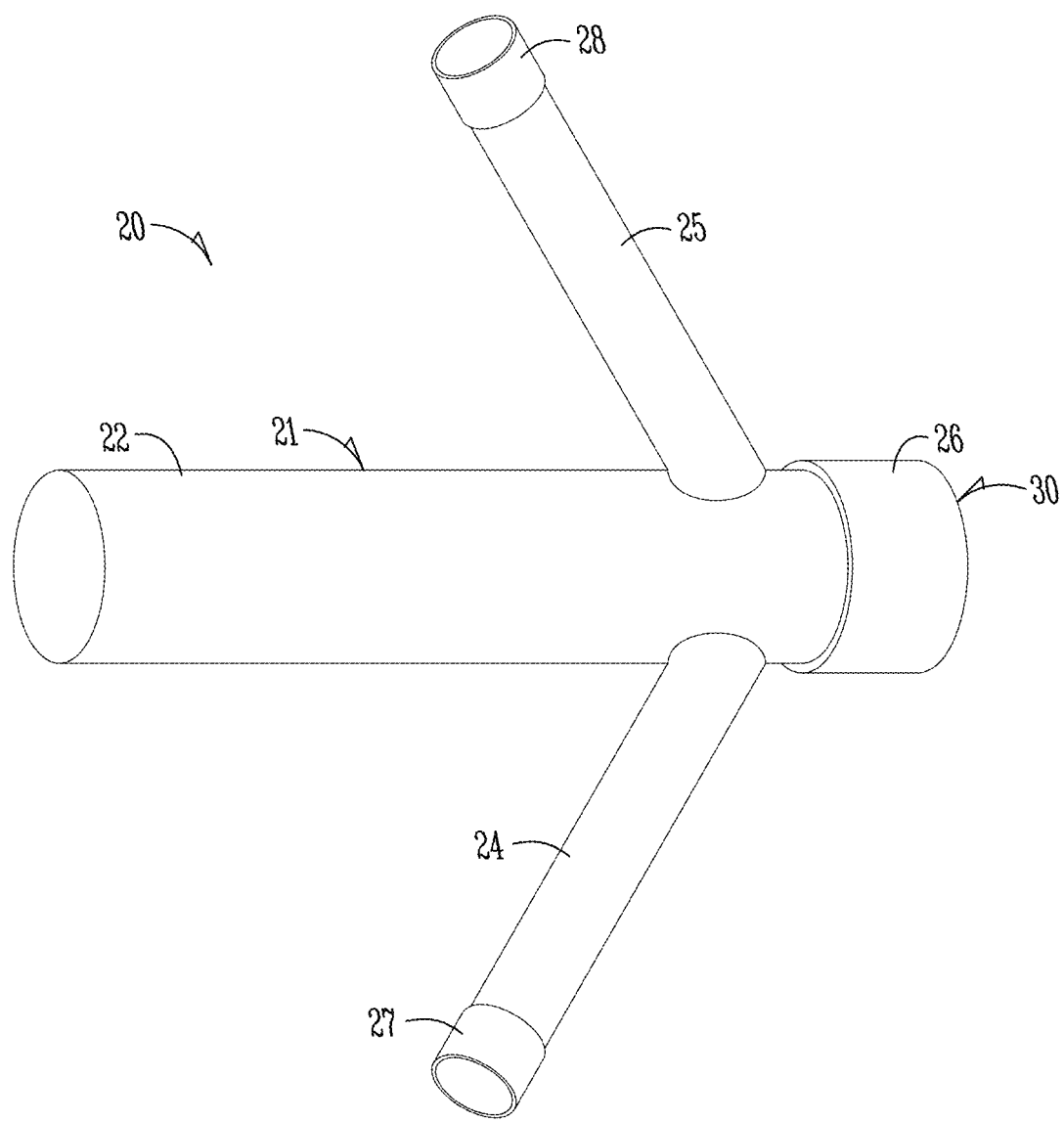
FIG. 2 is a view of a repair assembly for use with aspects of the invention.

FIG. 2 shows an exemplary embodiment of a repair assembly 20. The repair assembly includes a bladder assembly 21 comprising a main bladder tube 22, as well as a plurality of lateral bladders 24, 25 fluidly attached to and extending therefrom. In the assembly shown, there are two lateral bladders 24, 25 attached to the main bladder 22. The main bladder tube 22 may include apertures, such as main bladder tube openings positioned radially about the axis of the main bladder tube. The lateral bladder tubes 24, 25 can be connected at the main bladder tube openings, such as by stitching, welding, adhesives, or the like. The main and lateral bladder tubes 22, 24, 25 comprise a generally fluid impermeable material such that they are able to expand with the introduction of a fluid into the bladders. The bladders may include an open end and an opposite closed end, which can be an end that is closed off. Furthermore, the bladder may be translucent or opaque depending on the type of resin used with the liner assembly 30, as will be discussed. It should be appreciated that any length of main bladder tube 22 may be utilized to repair a length of the main pipe 14. For example, in some instances, the full length of main pipe 14 will need to be lined and repaired, while in others, only a portion of the main liner is repaired. Furthermore, the lateral bladders 24, 25 will be sized such that they are able to extend the full length of repair into the corresponding lateral pipes.

Once the configuration of the main and lateral pipes has been determined, the main and lateral bladders may be prepared according to the specifications of the pipe system. The pipe system configuration, including specifications for the pipe lengths, diameters, orientations, locations, change in diameter, etc. can be determined in many different ways. For example, a camera may be used to pass through the various components of the pipe system to determine said specifications. Alternatively, a laser measuring apparatus can be passed through the pipe system to accurately measure the layout and specifications for the pipes of the pipe system. Any other method of determining the specifications and/or other characteristics of a pipe system are contemplated. This will determine the preparation of the bladder and liner assemblies, including, but not limited to the number of lateral bladders needed. For example, the lateral bladders 24, 25 may be positioned along the length of the main bladder tube 22 such that as the main pipe is being repaired, the lateral bladder tubes will align or match up with the openings of the lateral pipes extending from the main pipe.

Furthermore, it should be appreciated that the method of repairing the pipes may utilize an inversion process. As is known, the inversion process provides that the lateral bladder tubes 24, 25 are inverted to a position at least partially within the main bladder tube 22. The closed end of the main bladder tube 22 will be everted through itself, and can pass through a launcher opening, according to some aspects, which may be a separate element or the open end of the bladder itself. As air or another fluid is introduced to the bladder assembly 21, the closed end of the main bladder tube 22 everts from within itself and towards a distal end of the main pipe 14, i.e., towards the second manhole 12. At a location of the lateral pipe openings, the lateral bladder tubes 24, 25 will be everted or forced through the main bladder tube openings and into the lateral pipes with the closed end of each of the lateral bladder tubes 24, 25 being everted through itself and towards a distal end of the lateral pipe.

As should be appreciated, the eversion of the bladders can begin at or near a first manhole, or can begin at a distance away from the first or second manhole. For example, according to some aspects of the invention, the repair of the main pipe may not be needed for the full length of the pipe, and instead, may begin adjacent the first lateral pipe or even past the first lateral pipe. The bladder assembly can be configured to match up with such a configuration, as needed.

Figure 3:
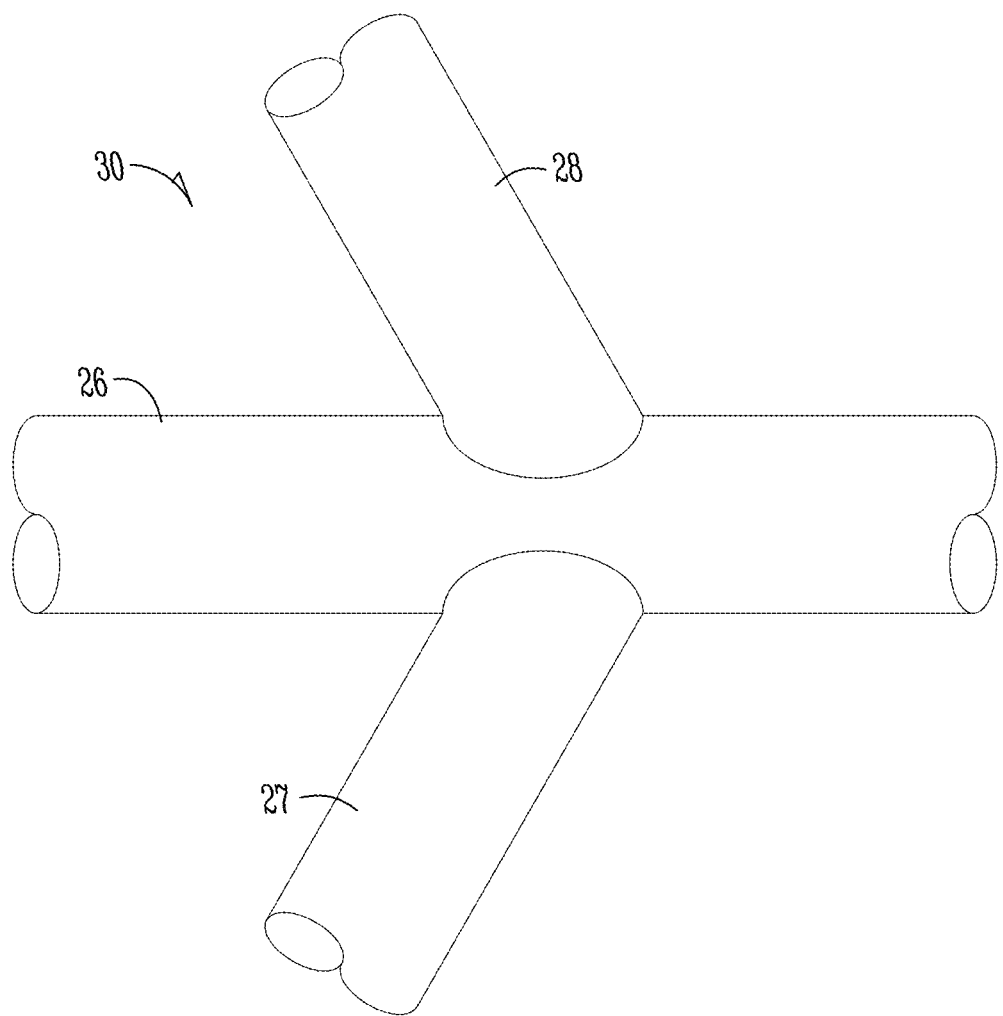
FIG. 3 is a view of a liner assembly for use with the repair assembly according to aspects of the invention.

Also shown in FIG. 2, as well in FIG. 3, is a liner assembly 30. The liner assembly 30 includes a main liner member 26 connected to a plurality of lateral liner tubes 27, 28 extending therefrom. While the figures show a liner assembly 30 with two lateral liners 27, 28, it should be appreciated that the invention includes the use of any one or more lateral liners. The main liner member 26 may comprise a tube or tubular shaped member, or can be a flat sheet rolled up with ends at least partially overlapping one another. The lateral liner tubes 27, 28 are attached to the main liner member 26 at liner junctions. The lateral liner tubes 27, 28 may be attached at main liner member openings via stitching, welding, adhesive, tape, liquid resin, or the like. For example, according to some aspects of the invention, the liner tubes are stitched to the main liner, and then a UV-curable resin is added at the junctures and cured to aid in sealing the liner assembly 30. Furthermore, the main and lateral liners comprise a resin absorbent material, such as felt or the like. As will be understood, the liner assembly 30 is impregnated with a resinous, epoxy, or grout material capable of curing and hardening prior to being positioned within the main and lateral pipes. The resin absorbent material of the liners will hold the material and transport it to the pipes to cure, thus, repairing the pipes.

The main and lateral liners 26, 27, 28 may be sized to substantially or approximately the size of the pipes being repaired, or can comprise a material such that one size of liner may be used for any number or size of pipes. For example, the liners may comprise a material that is larger or smaller than one or more portions of the pipes such that the liner is able to expand or fold on itself at the varying diameters of the pipes. Furthermore, in at least some embodiments, the main liner 26 comprises a configuration that prevents longitudinal stretching of the liner during the repair process. This may include the use of glass or other materials oriented a specific way in a layer of the liner, or any other way that is known to prevent the longitudinal stretching. Such a configuration is disclosed in U.S. Ser. No. 12/987,722, which is hereby incorporated by reference in its entirety.

The bladder assembly 21 can be utilized to expand to press the main and lateral liners toward and against the walls of the main and lateral pipes. Furthermore, similar to the lateral bladders, the lateral liner tubes 27, 28 are fluidly attached to the main liner member 26 such that the lateral liner tubes will extend into the lateral pipes as the system is inverted through the main pipe. Therefore, the lateral liner tubes are measured and attached to the main liner member according to the specifications of the pipe system to be repaired, e.g., according to the number and configuration of lateral pipes.

The repair assembly 20 as shown in FIG. 2 shows the liner assembly 30 in its inverted position generally within the bladder assembly 21. Before the inversion of the repair assembly 20 into the pipe system, the main liner member 26 will be positioned generally, or at least partially, within the main bladder tube 26 and the lateral liner tubes 27, 28 will be positioned generally, or at least partially, within the lateral bladder tubes 24, 25. The lateral bladder tubes and liner tubes will also be at least partially inverted within the main bladder as well. As will be understood, as the assembly is everted through the pipe system, the eversion of the bladders under the fluid pressure cause the liners to move from the position within the bladders to a position generally between the bladders and the main and/or lateral pipes. The continued pressure of the bladders will press the liners against the main and plurality of lateral pipes until the material impregnated within the liners has cured and hardened. At this time, the bladders can be removed from the pipe system, thus remaining a repaired section of main pipe as well as repaired plurality of lateral pipes extending from the main pipe.

Furthermore, the length of the main and/or lateral liners may be varied according to the repair needs. For example, in some instances, the full length of the main pipe will be repaired, and thus, the length of the main liner member will be the full length of the main pipe. However, in other configurations, only portions or select distances of the main pipe will be repaired, while also repairing the lateral pipes extending therefrom. In such configuration, the location and distance of the main pipe to be repaired is determined, such by the use of a camera and measuring the cord connected thereto. The liner can then be located within the bladder to provide that the liner will be everted to cover only the portion of pipe to be repaired. Such a method of measuring and locating can be found in U.S. Ser. No. 12/250,264, which is hereby incorporated by reference in its entirety. Furthermore, it is contemplated that sections of main pipe be repaired by sections of main liners. For example, it is contemplated that multiple sections of main liner members be separate from one another and located in the bladder assembly such that they will be everted to repair only select locations of the main pipe, while also providing for the use of one or more lateral liner tubes to be everted into the one or more lateral pipes, as the main bladder and liner are everted through the pipe.

In another exemplary embodiment of the invention, it is contemplated that the bladder assembly 21 may not be required. For example, the liner assembly 30 may comprise a first layer of felt or resin absorbent material and a second impermeable coating layer. The main liner and the one or more lateral liners extending from the main liner will have an open end near a launching device or fluid source and an opposite closed end. The closed end could be formed by banding or otherwise closing a second open end of the liners. The liner assembly 30, in this embodiment, can be inverted within itself such that the felt or resin absorbent layer is initially positioned on the inside (facing inward) and the liner assembly is everted from itself such that the felt layer will be positioned between the fluid impermeable coating and either the main or lateral pipe wall to be repaired. An example of such a liner is disclosed in U.S. Patent Publication 2013/0081732, which is hereby incorporated by reference in its entirety. Furthermore, once the resinous material has cured and hardened within the main pipe and the one or more lateral pipes, the closed ends of the liner assembly can be cut using a cutting robot or tool to reinstate access through the main and lateral pipes. However, it is also contemplated that the ends of the liners remain open, and/or the ends of the lateral tubes could be closed by attaching a parachute end, or an inflatable plug could be inserted into the open end of the lateral liner tubes. These are not to be considered an exhaustive list.

According to addition aspects, the main liner member 26 includes an impermeable coating, and the lateral may or may not. There would be no bladder used to evert and inflate or expand the main liner tube, but there is a lateral bladder in the lateral liner tubes. In such an embodiment, the lateral bladder tubes may extend into the main liner tube by way of a flange located at the lower end of the lateral bladder. That flange can be frangibly connected to the main liner tube and sealed to the coated side of the main liner. The ends of the main tube are closed and require cutting, but the upper ends of the lateral tubes remain open by the lateral bladders.

Figure 4:
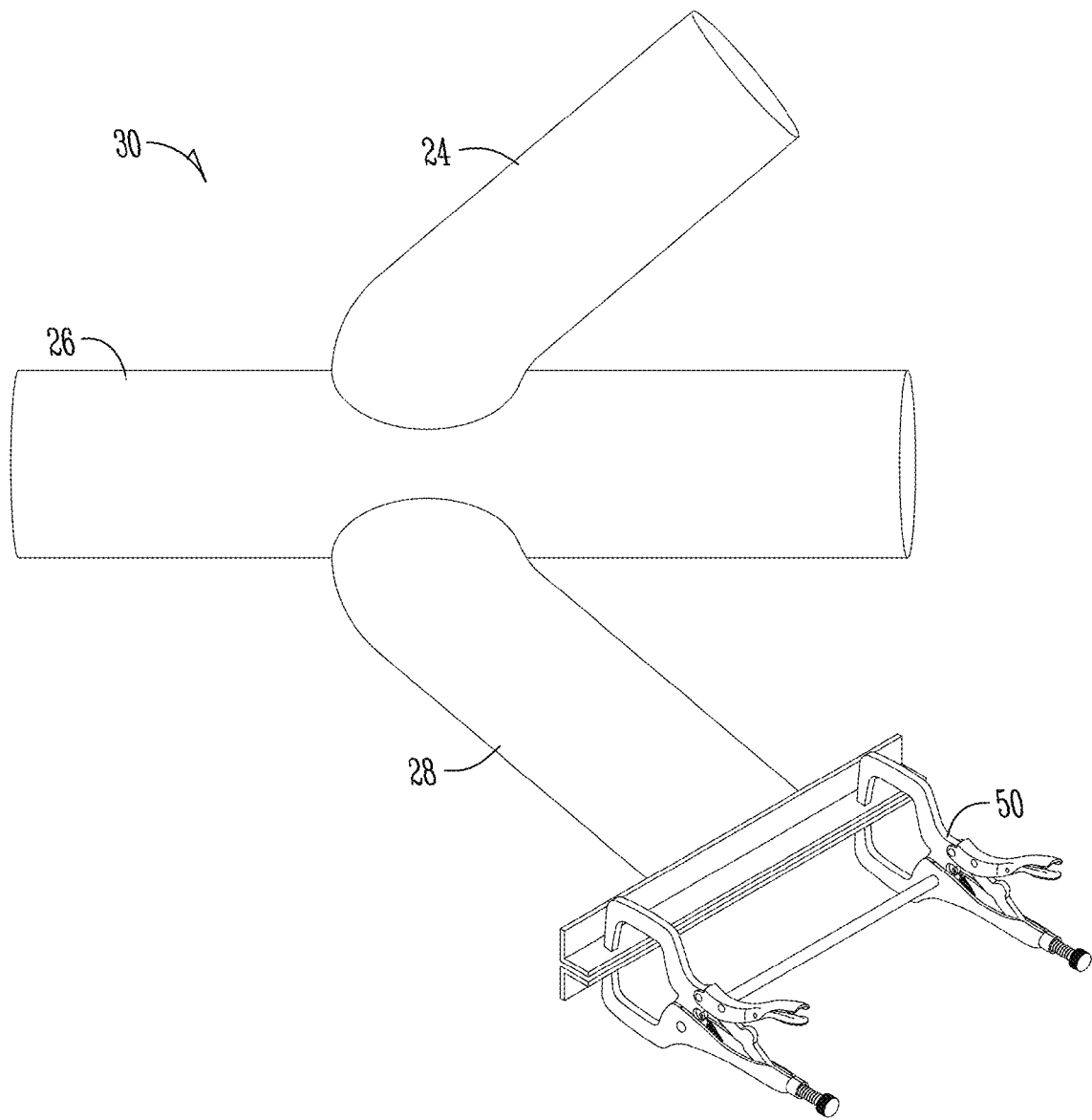
FIG. 4 is a view of a liner assembly being impregnated with a material capable of curing and hardening.
Figure 5:
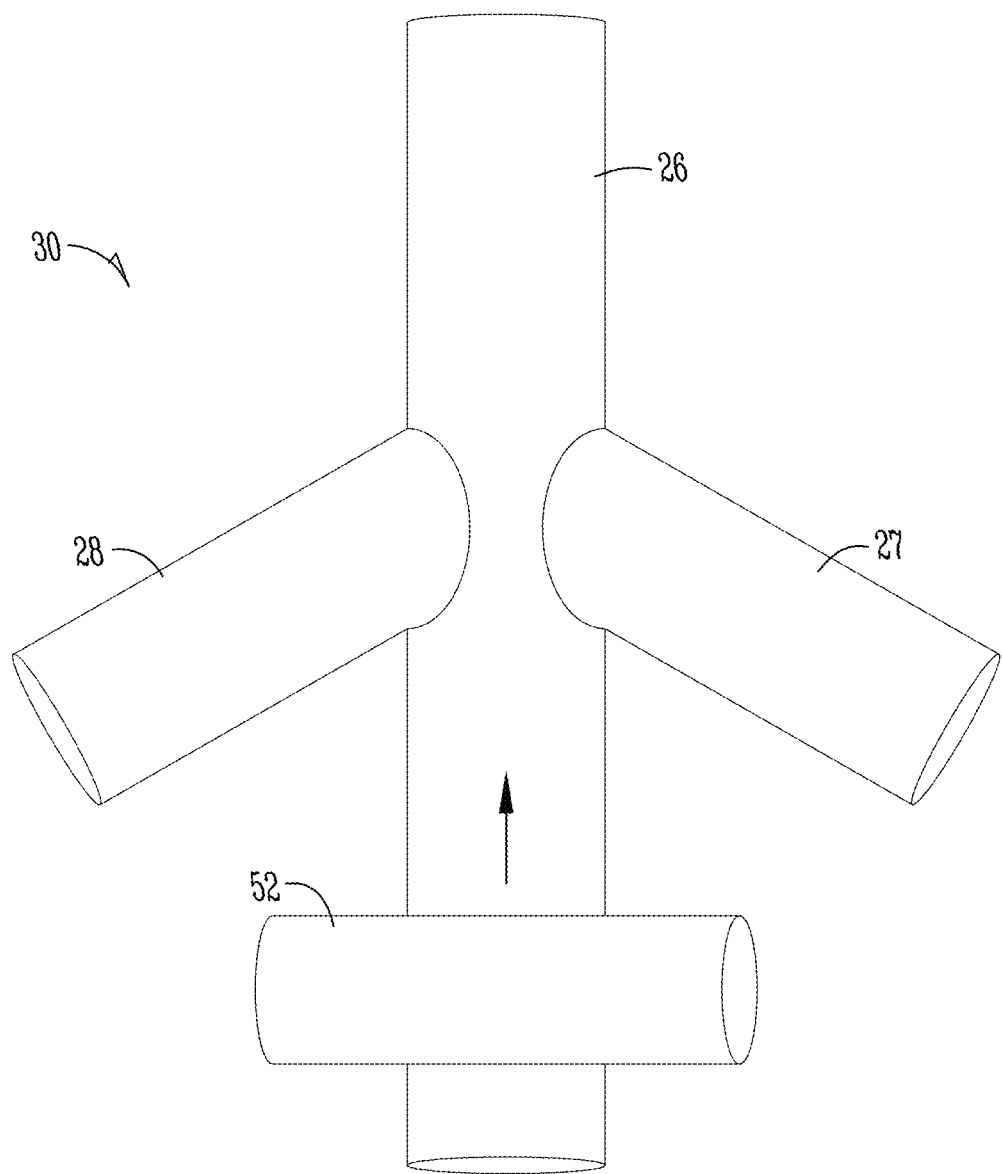
FIG. 5 is another view of the liner assembly being impregnated with a material capable of curing and hardening.

FIGS. 4 and 5 show aspects of the resin impregnation process for the liner assembly 30. This may also be known as the wetting out process. Once the repair assembly has been assembled with the liner assembly 30 being positioned generally within the bladder assembly 21, the resin material can be impregnated into the liner assembly 30. The open ends of the liner and bladder assembly are temporarily clamped shut, such as by a clamp 50, as shown in FIG. 4. However, both ends of the main bladder 22 can remain open. A vacuum system is attached to an open portion of the assembly or main bladder to draw air and resin through the assembly to ensure that the full liner assembly is impregnated with the resinous material. The resinous material is poured into another open end of the main bladder with the bladder assembly on the outside of the liner assembly. A weighted roller 52, as shown in FIG. 5, or two calibrating "pinch rollers", can be used along with the vacuum to aid in drawing and working the resinous material through the full length of the main and lateral liners of the assembly. The assembly is worked until the full length of the main liner as well as all of the lateral bladders extending therefrom has been impregnated with resinous material.

The resinous material used to repair the pipe assembly may be any type of curable liquid resin that is appropriate for the application such as epoxy or polyester type resin systems. Furthermore, the resin may be any type of curable resin. Types of curable resin may include a two-part resin wherein the resinous material begins to cure once the two parts of the resin have been mixed together. When a translucent bladder assembly is used, the resin may be a photo curing resin, such as a UV resin wherein once the assembly is expanded within the main and plurality of lateral pipes, a light, such as UV light is incorporated within the bladder assembly to cure the resin therein. Other types of lights may be used with photo curing resins that are capable of curing with exposure to any light. A thermoset resin may be used with the assembly such that the introduction of heat by steam or other heat source is provided as the expanding fluid to activate the curing of the resin once the assembly has been positioned within the main and plurality of lateral pipes. It should be appreciated that this is not to be understood to be an exhaustive list of the types of resins, grouts or other materials used for curing and hardening within the pipes, and that the present invention contemplates that generally any type of curable material capable of curing and hardening may be utilized with the repair assembly 20 of the present invention such that the material is capable of curing and hardening within the pipe to repair the wall of a pipe according to industry standards.

It should be noted that if the liner is installed from manhole to manhole, then there will not be a bladder used and the rope or string is connected directly to the ends of the liner tubes. The ropes or strings can aid in determining the length of the main and lateral liner tubes as they are inflated and/or expanded through the pipes. A bladder is generally used when the repair is made in the pipe at a localized location, or when the repair begins at a manhole and terminates shy of the adjacent manhole.

Figure 6:
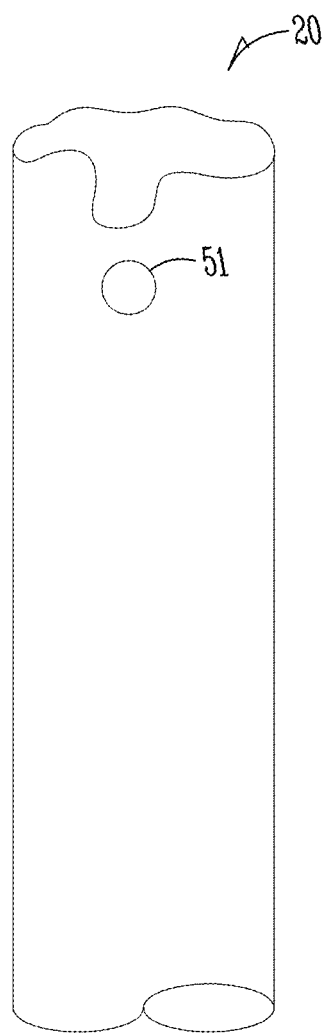
FIG. 6 is a view of an end of the liner assembly during preparation of the repair process.
Figure 7:
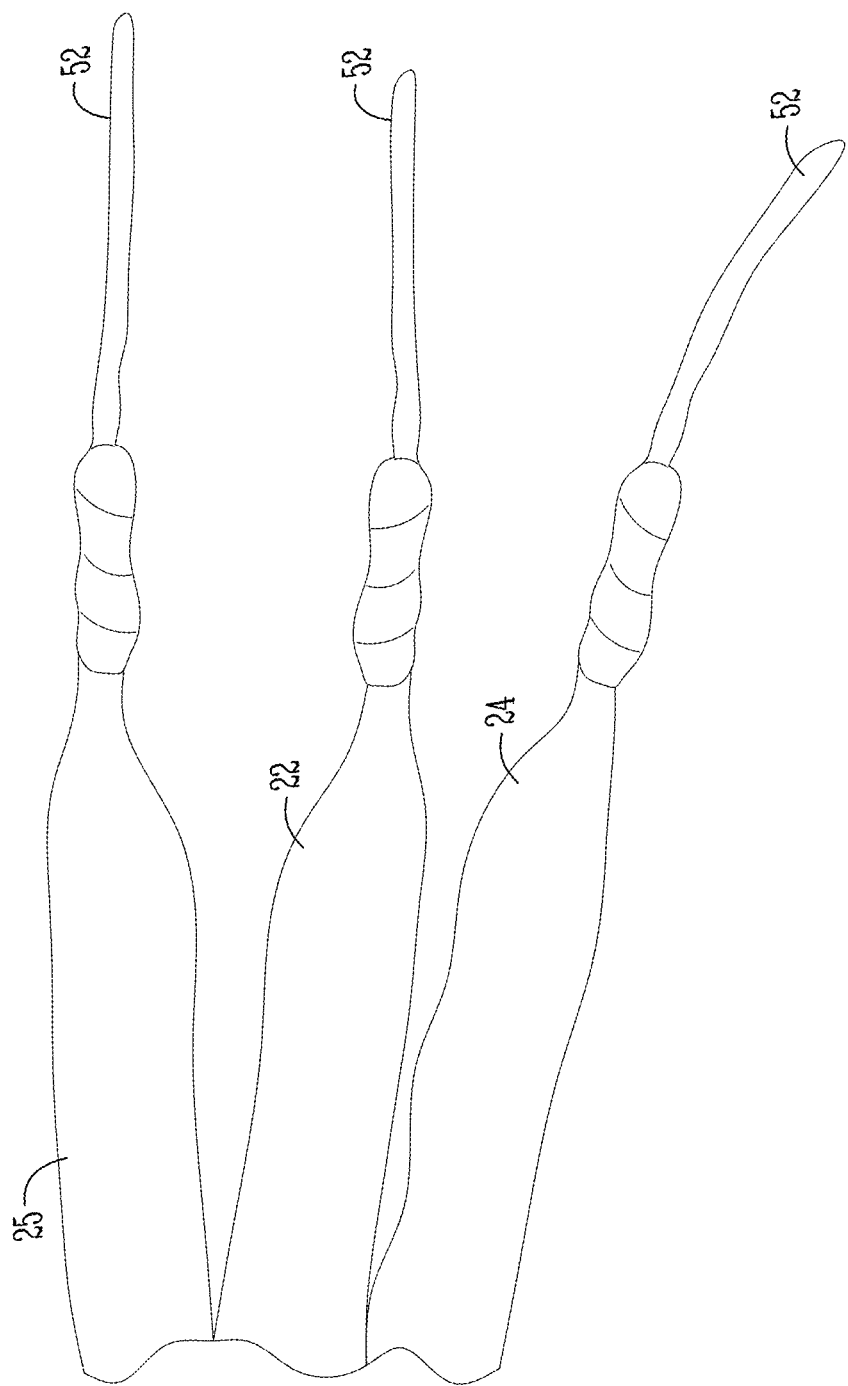
FIG. 7 is a view of closed ends of the liner assembly with ropes attached thereto.

Once the liner assembly has been impregnated with the material capable of curing and hardening, and possibly even before that step, the main and lateral bladders 22, 24, 25 of bladder assembly 21 have an end that is closed off and fitted with a control string or rope 52. The string 52 may be attached to the closed end of the bladder assembly, as is shown in FIGS. 6-7. As will be understood, the strings or ropes 52 will be strung through a hole 51 of the repair assembly 20 and out the launcher end and/or launcher device. The strings 52 can be utilized to ensure that the full length of the main and lateral bladders have been inflated and expanded through the main and lateral pipes, and also used to remove the bladders from the pipes once the material has cured and hardened in the pipes. As shown in FIG. 6, the bladders may be punctured and rope attached through the hole 51 in the bladders. The end of the bladders with the string or rope 52 may be then closed off using tape or other banding means, as is shown in FIG. 7.

Figure 8:
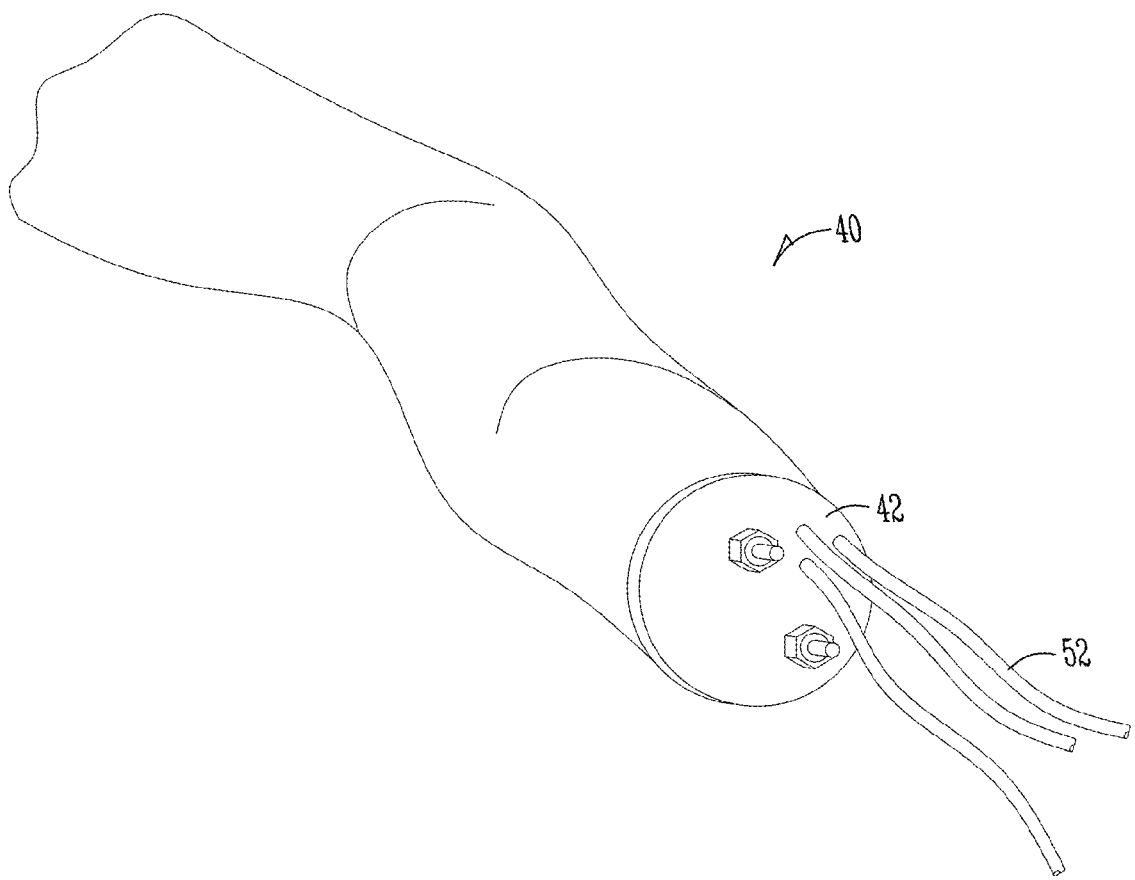
FIG. 8 is a perspective view of an end of the repair assembly with a fluid hookup attached thereto.

FIGS. 7 and 8 show an assembly 20 that has been impregnated with the resinous material, closed off, and attached to strings 52 being strung through a launcher device 40, such as a lay flat hose with a fluid head at the end. According to embodiments of the invention, a lay flat hose may be used as a launcher device 40 at the service pipe or manhole on the upstream side of the repair. The repair assembly 20 can be positioned through the launcher device 40 such that the liner assembly 20 is positioned generally on the interior of the bladder assembly and the bladder assembly is inverted on itself through the launcher device 40. It should also be noted that the main liner member could be frangibly attached to the main bladder tube to aid in maintaining the position of the repair assembly 20. As shown in FIG. 8, a fluid connection 42 is connected at an end of the launcher device 40 and the ropes 52 connected to each of the ends of the main and lateral bladders are strung through the fluid connection 42. It should also be appreciated that the number of ropes generally matches up with the number of bladders used. Thus, when a main and two lateral pipes are being repaired with the repair assembly, a separate rope (three in total) will be connected to the end of the main pipe and each of the two lateral bladders. Therefore, as shown in the Figures, the particular configuration shown will include three ropes. If more or less lateral bladders will be repaired with the repair assembly, additional ropes can be utilized and attached to the ends of each of the additional lateral bladders, or can be removed.

Figure 9:
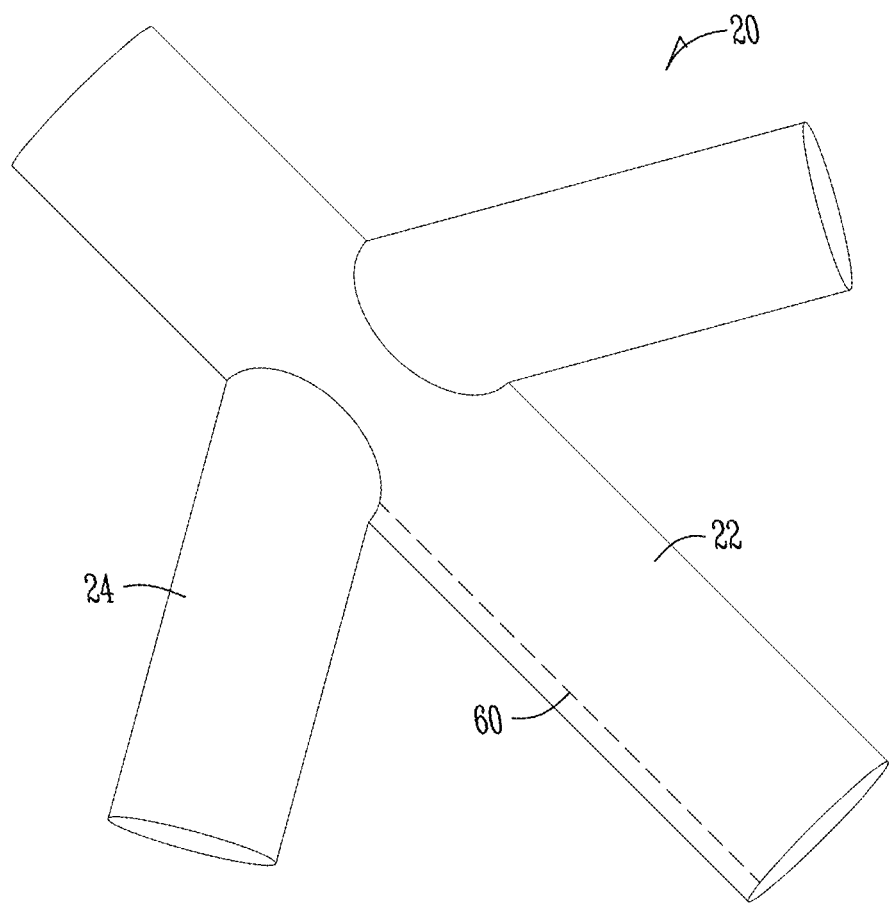
FIG. 9 is a view of the repair assembly being marked for orientation during the repair of the pipe system.

Prior to inverting the components of the repair assembly 20 into and through the launcher device 40, a reference marker 60 can be marked on the main bladder 22, as is shown in FIG. 9. The mark can be used to aid in orienting the assembly 20 prior to eversion and also while in the pipe system. There are at least two different methods of installation. One method uses a launcher (lay flat hose) positioned in a pipe and another method uses some sort of launcher (reel) located outside of the pipe. Regardless of the installation method, it is preferred that the pipe is surveyed using a digital video capture measuring device. This device is a tool that captures and records the exact or approximate configuration of the main and lateral piping system between an upstream and a downstream manhole. An example of the digital video capture-measuring device is an IBAK Panoramo camera sold by Rapid View, 1828 West Olson Road, Rochester, Ind. 46975. However, other types of robots and places of purchase may be used. The data, including specific measurements, can be used to create a blueprint of the pipe. A liner assembly is made to substantially match the piping blueprint.

A bladder assembly 21 is used and has a configuration substantially matching the liner assembly 30 when the liner is used to repair a localized section of main and one or more lateral pipes, and the repair does not include the entire length of main pipe from manhole to manhole. In this situation, the launcher may be located within the main pipe, or the launcher may be located outside of the main pipe. Regardless of the location of the launcher, it is noted that the main liner tube 26 is frangibly attached to the main bladder 22. During the manufacturing process of the bladder, a reference mark 60 is made on the exterior surface of the main bladder 22 at a location to be identified as a 12:00 pipe reference. The liner and bladder are formed as a liner/bladder assembly 20. The assembly 20 is saturated with a liquid resin. The resin saturated repair assembly 20 is loaded or pulled into the launching device 40 by strings 52 attached to the end of each lateral bladder and the closed mainline bladder end. In the situation where the launcher is inserted into the pipe, the launcher is also pulled to the desired location at a predetermined distance from the manhole.

A robotically controlled camera can be located in the main pipe and positioned at the open end of the launcher such that the camera is viewing the everting face of the main bladder and/or liner. Identifying the proper distance can be accomplished by simply measuring the distance the launcher is pulled into the pipe. Fluid pressure is then applied to the launcher causing the liner and bladder to begin to evert out from the launcher and into the pipe. As the main bladder 22 extends approximately 18+ inches past each end of the main liner tube, the main bladder tube 22 will first evert out from the launcher 40. The camera operator will have a visual view of the bladder having the reference marker. The camera is outfitted with an instrument that identifies exactly 12:00 by a pointing laser beam or similar methods of marking the crown of the pipe at 12:00. The operator ensures that the reference mark on the mainline bladder is perfectly aligned with the 12:00 mark of the crown of the pipe. If the reference mark is not in alignment, the launcher is outfitted with a device that causes the launcher to rotate so the marks are aligned.

Figure 15:
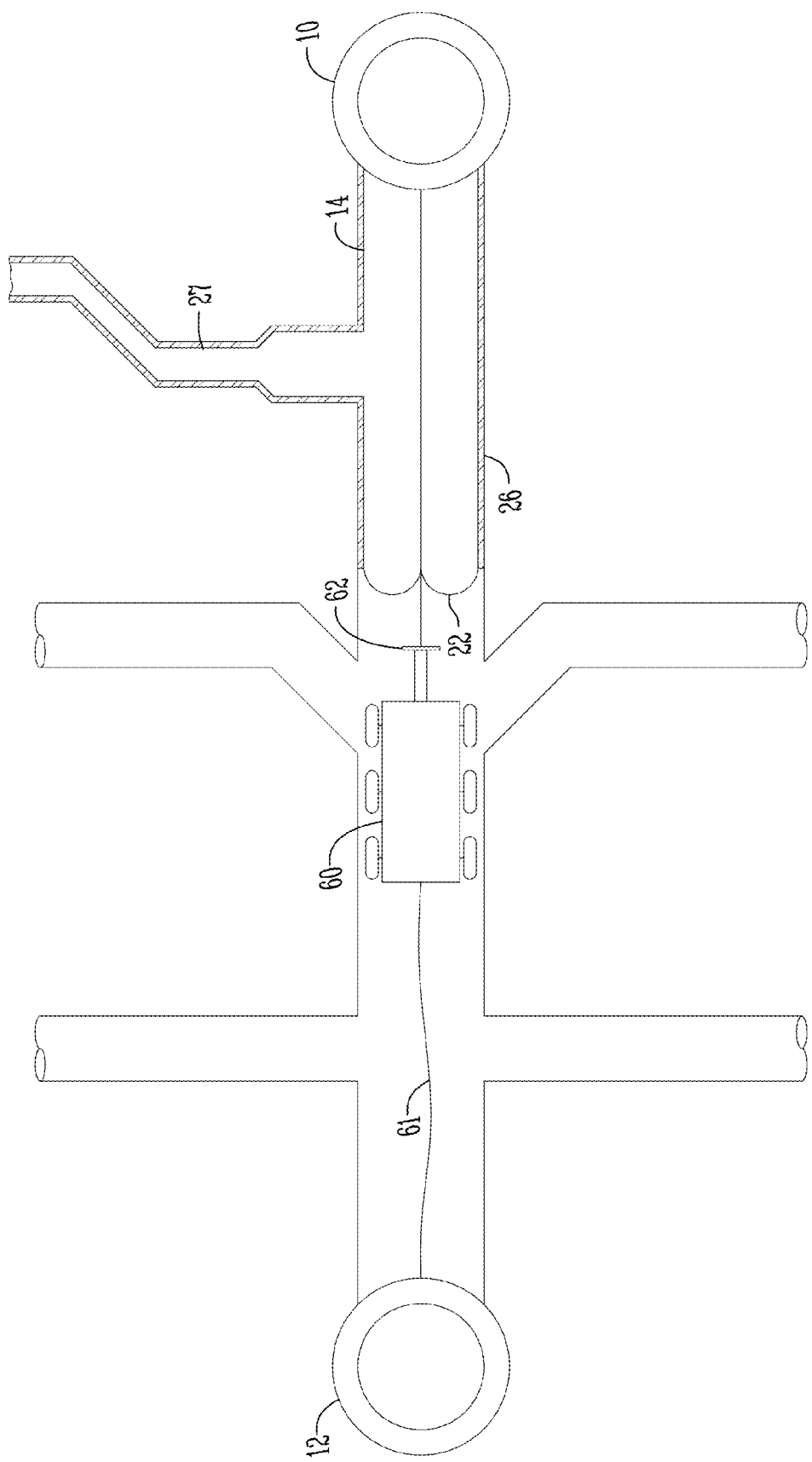
FIG. 15 is schematic view of a robotic device used to aid in orienting a repair assembly as it is inverted through a main pipe.

For example, as shown in FIG. 15, a robot 60 may be operatively connected to the lining assembly 20, such as by a guiding plate 62 with a protruding blade. The robot can be moved through the main pipe 14 via a rope or cord 61 as the liner assembly 20 is everted into the pipe system. A camera (not shown) can be positioned at or on the robot 60 to view the marker 60 on the bladder assembly 21. If the orientation of the marker 60 is not oriented correctly, the plate 62 of the robot 60 can be utilized to rotate the lining assembly 20, such that the lateral bladder/liner combinations will be aligned with the corresponding lateral pipes of the pipe system.

In the situation where a repair assembly 20 is used and the launcher does not enter the pipe, the main liner tube 26 is manufactured having the longitudinal reference mark in the same fashion as described for marking the bladder. Additionally, a mark is made around the circumference of the main liner tube, and this mark identifies a zero distance mark that is aligned with the face of the pipe opening at the insertion manhole. Again, the liner assembly is saturated and loaded into a launcher outside of the pipe. The liner/bladder assembly is inverted such that the circumferential mark is aligned with the face of the pipe and the main liner tube begins to invert, progressing through the pipe. In this situation, the camera is mounted to a robust mechanical robot 60 having a guide plate with a protruding blade 62 (see, e.g., FIG. 15). The robot 60 uses the camera to view the reference mark on the main liner tube. The robot 60 is also outfitted with an instrument that identifies the 12:00 reference mark. The robot may be a Schwalm robot distributed in North America by LMK Technologies, 1779 Chessie Lane, Ottawa, Ill. 61350. However, other types of robots and places of purchase may be used.

Once the liner has progressed a short distance into the pipe (e.g., approximately 1-2 feet), the robot 60 drives forward until the flat protruding blade is inserted into the elongated opening of the everting liner and the plate is in contact with the everting liner. At this time, the robot drive mechanism is placed in neutral. Additional fluid pressure is added, causing the liner/bladder assembly to continue inverting into the pipe, which also moves the robot as the liner is seated against the robot plate. The robot operator will then have a visual view of the main liner having the reference marker. The robot is outfitted with an instrument that identifies exactly 12:00 by a pointing laser beam or similar methods of marking the crown of the pipe at 12:00. The operator ensures that the reference mark on the main liner is substantially aligned with the 12:00 mark of the crown of the pipe. If the reference mark is not substantially in alignment, the robot with its mechanical arm rotates, causing the liner to rotate so the marks are substantially aligned.

In the situation where the entire main pipe and one or more laterals are to be renewed between an upstream and downstream manhole, there is no requirement for a mainline bladder. In this case, the mainline liner includes plastic coating on its exterior before inversion, which everts to be on the interior of the liner post inversion. Because access to the liner is available from each manhole, the ends of the mainline liner are closed and cut open post curing of the resin. The lateral liners may also be closed, or may include a lateral bladder that is connected to the coating of the mainline liner tube. A parachute may also be attached to the upper end of the lateral bladders. The mainline liner tube is manufactured having the longitudinal reference mark and additionally, a mark is made around the circumference of the mainline liner tube. This circumferential mark identifies a zero distance mark that is aligned with the face of the pipe opening at the insertion manhole. Again, the liner assembly is saturated with resin. The mainline liner, the lateral liner or liners, and possibly a lateral bladder are loaded into a launcher (typically a pressure vessel with an outlet pipe). The liner/bladder assembly is inverted so the circumferential mark is aligned with the face of the pipe and the mainline liner tube begins to invert, progressing through the pipe. The robot identifies the 12:00 location of the pipe and ensures the reference mark on the mainline liner tube is aligned with the mark on the crown of the main pipe. By ensuring the manufactured mark on the liner is aligned substantially at true 12:00, and by aligning the circumferential mark on the liner with the pipe opening at the inserting manhole, the lateral liner tubes will align with the lateral openings in the main pipe as the mainline liner tube is inverted from one manhole to the adjacent manhole. The mainline liner tube may be constructed with materials that resist stretch, such as continuous longitudinal glass strands, carbon fiber filament, woven scrim, or other high tensile materials to further aid in aligning the lateral liners and pipes.

As the repair assembly 20 is being inflated and expanded through the main pipe 14, a positioning system, such as a ring gear and motor, may be operatively connected to the launcher device 40 and/or repair assembly 20. The motor may be electric or air driven and can be used to rotate the assembly 20 via the ring gear to align the lateral bladders/liners with the lateral pipe or pipes to be repaired. If, for some reason, the assembly is inadvertently rotated during the inflation of the bladders, the inversion can be halted momentarily and the positioning system can be used to rotate the assembly such that the reference marker associated with a specific lateral pipe aligns with the lateral pipe to be repaired. The inflation or expansion can then be continued with greater confidence that the one or more lateral pipes being repaired will be aligned with the lateral bladder and liner assemblies.

Figure 10:
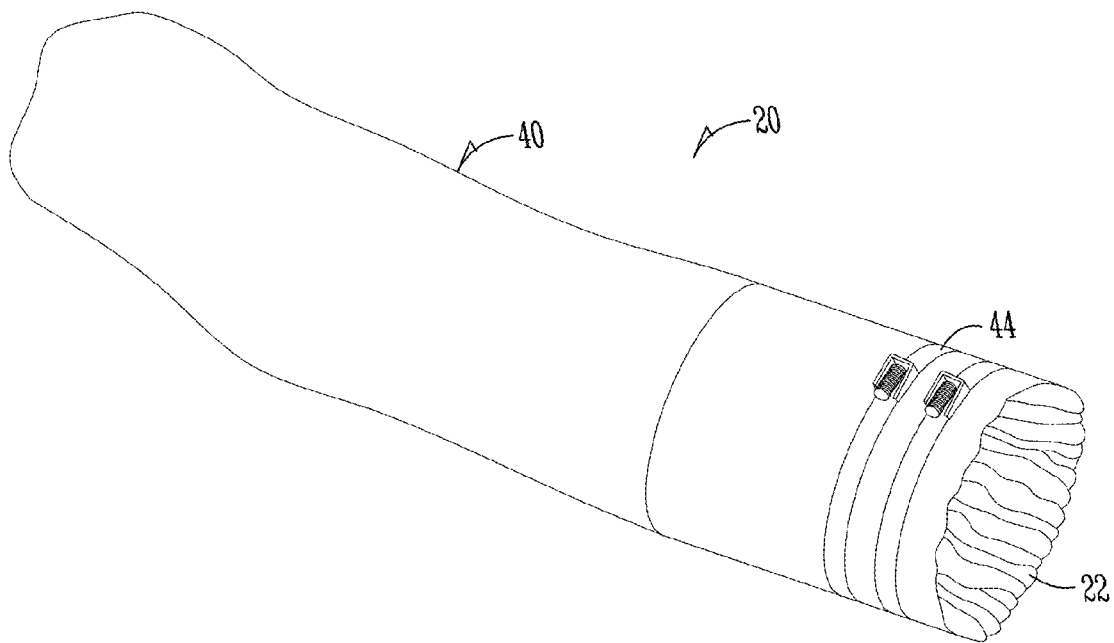
FIG. 10 is a view of the repair assembly being prepared by banding an end of the repair assembly prior to positioning within the pipe system.
Figure 11:
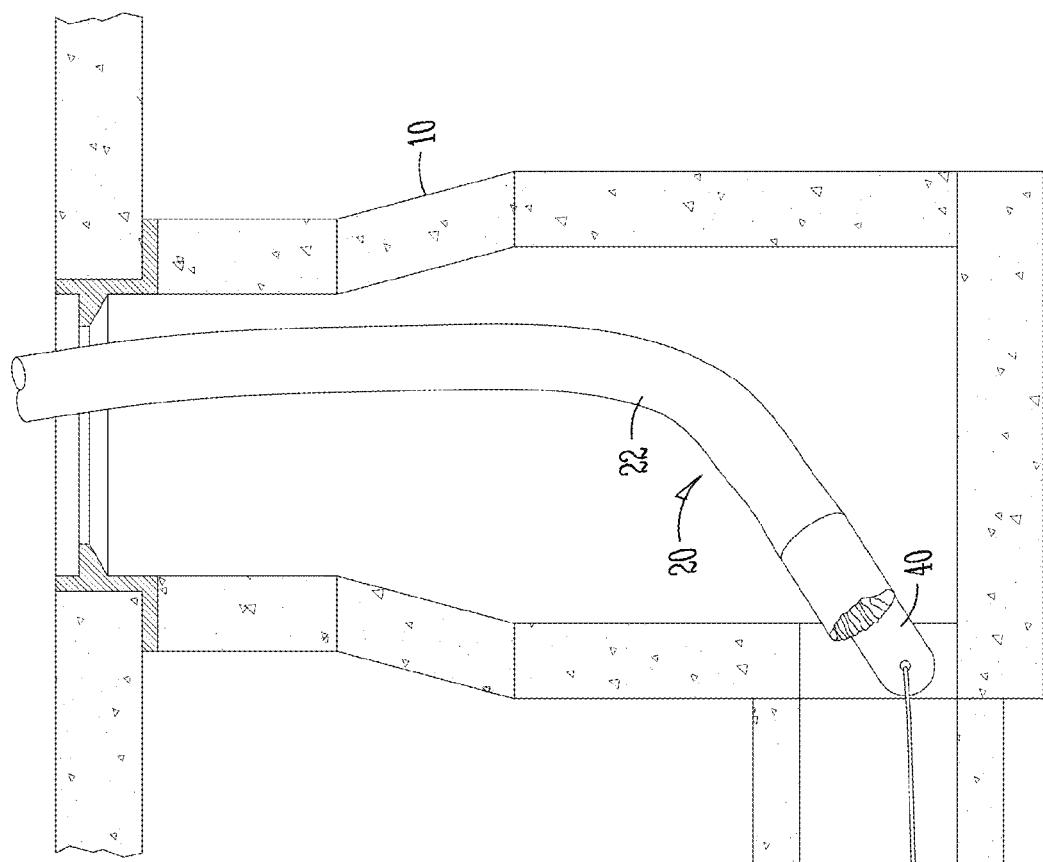
FIG. 11 is a view of the end of a configuration of the repair assembly according to aspects of the invention.

FIGS. 10-11 show the assembly being inverted into the launcher device and becoming aligned with the main pipe to be repaired. FIG. 10 shows the repair assembly 20 after it has been pulled through the launcher device opening. As shown in FIG. 10, the open end of the main bladder 22 can be folded upon the launcher device opening. As shown in FIG. 10, the open end of the bladder is connected to the launcher device opening by the use of banding 44 such that it is fluidly sealed to the launcher device 40. The banding 44 may comprise tape, clamps, and any other means, which will provide a fluid tight seal at the launcher device opening between the launcher device opening and the open end of the main bladder.

Furthermore, it should be appreciated that the invention contemplates that the assembly 20 may not need a launcher device in all embodiments. In such embodiments, the open end of the main bladder is simply folded over itself at the air source and is fluidly sealed to the fluid source such that the fluid source will cause the assembly to evert through the fluid source and into the pipe. An example of utilizing a bladder folded over itself without the use a launcher device is shown and described in U.S. Patent Publication 2010/0301505, which is hereby incorporated in its entirety. As shown and described in the '505 publication, the bladder may attach to a reel such that the reel provides a fluid source to invert the bladder and liner assembly through the pipe without the use of a launcher device or lay flat hose.

FIG. 11 shows the repair assembly 20 connected to the launcher device 40 and being aligned with the main pipe 14. Once the repair assembly 20 has been inserted into and attached to the launcher device 40, the assembly 20 is then aligned with the main pipe opening 14. This will generally be within the service pipe, which may be the upstream manhole 10, but could be in any service pipe. The repair assembly 20 is positioned generally at the opening of the main pipe 14 such that the main pipe can be repaired from the beginning of the pipe. However, as mentioned, the repair assembly 20 can also be moved to a position within the main pipe 14, such as at a location from the opening of the main pipe at the manhole. Once the assembly is aligned, air, steam, or another fluid is introduced to the repair assembly to begin expanding the main and lateral bladders such that the system will be everted into and through the main and lateral pipes.

The inflation and expansion of the repair assembly 20 may be viewed via a downstream camera that is introduced to the main pipe via the downstream manhole 12. For example, the everting face of the bladder could be viewed by the camera, which can send the video to a source outside the pipe, such as a screen, phone, tablet, computer, or other device. Such an everting face will indicate that the system is moving through the main pipe. Additional cameras may be introduced through the opposite ends of the lateral pipes to indicate or show that the lateral pipes are being repaired as well by the expansion of the lateral bladders and liners into the lateral pipes.

Furthermore, as mentioned, the assembly 20 may need to be rotated or otherwise oriented during the expansion of the bladder assemblies to align the one or more lateral bladder/liners with the one or more lateral pipes being repaired. While it has been disclosed that the positioning can be done at the upstream manhole, such as at the launcher device, for expansion of the system, it is also contemplated that the positioning and/or orienting can be done at the inverting face of the main bladder. For example, it is contemplated that a robot including a camera and blade type member can be introduced through the downstream manhole 12. As the camera provides a display of the inverting face of the main bladder, an operator may determine if the system has rotated during the expansion of the system. For example, as is known in the art, the inverting face may have a smiley face type configuration or appearance due to the expansion and inversion of the main bladder. If it is determined that the inverting face of the bladder or liner has rotated based upon the orientation of the "smiley face", the positioning blade may be inserted into the inverting face of the bladder, and the robot used to rotate the repair assembly 20 within the pipe. The repair assembly 20 is rotated to realign the inverting bladders and the pipes such that the one or more lateral bladders are aligned with the lateral pipe openings such that the plurality of lateral pipes may be repaired along with and during the repair of an extended length of main pipe.

Figure 12:
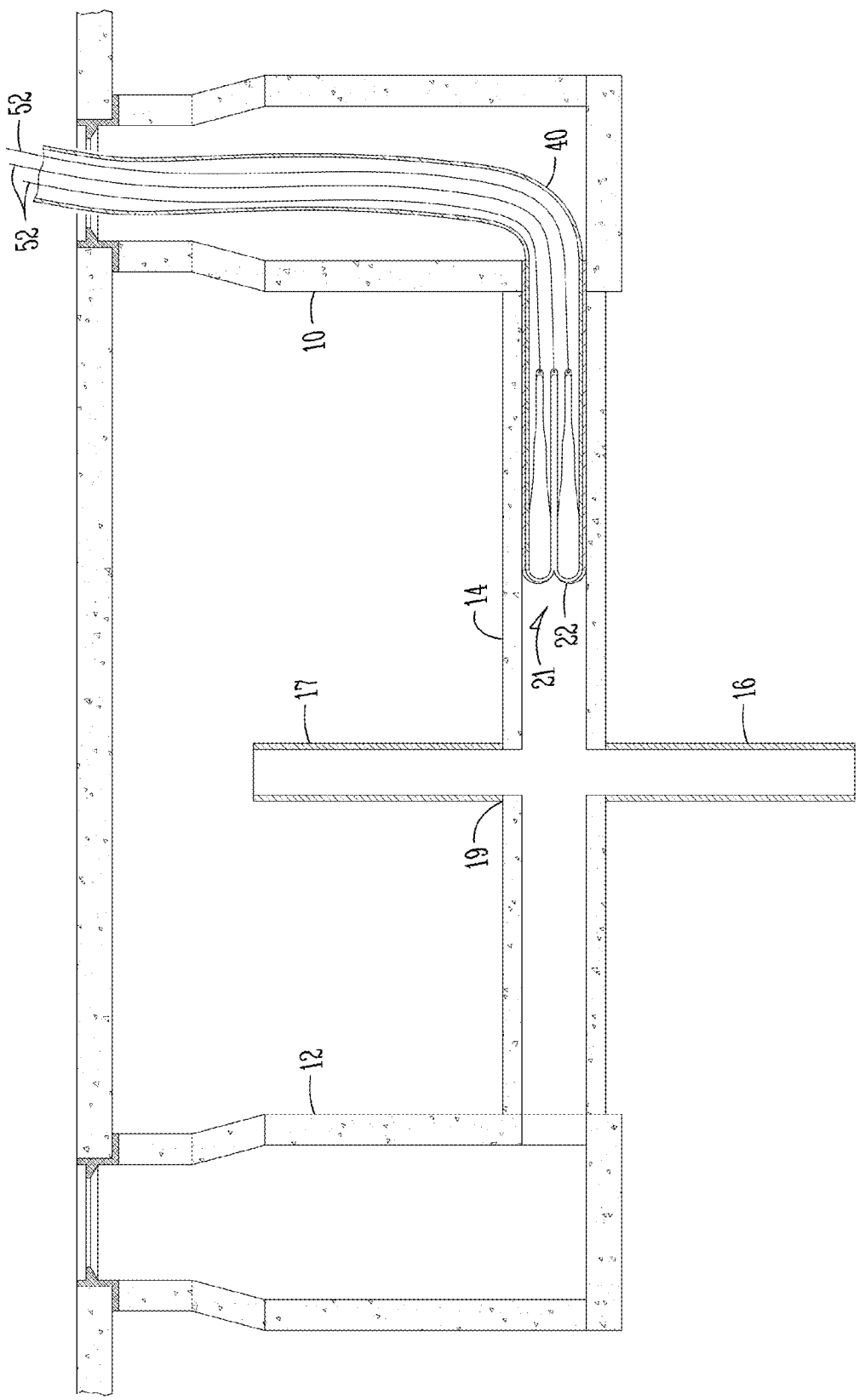
FIG. 12 is a sectional view of the pipe system being lined according to aspects of the invention.

FIG. 12 shows an exemplary embodiment of a main pipe as well as first and second lateral pipes 16, 17 extending therefrom. The Figure is included to show a type of pipe system that may be repaired using the method and apparatus of the invention, as the invention begins positioning through the pipes. The invention is capable of repairing an extended length of main pipe as well as one or more lateral pipes extending from the main pipe at the same time and using the same assembly of repairing the main pipe. Furthermore, this is done without the use of launcher device at each of the lateral pipe openings, which can reduce the accuracy of lining the lateral bladder and liners with the lateral pipes.

Figure 13:
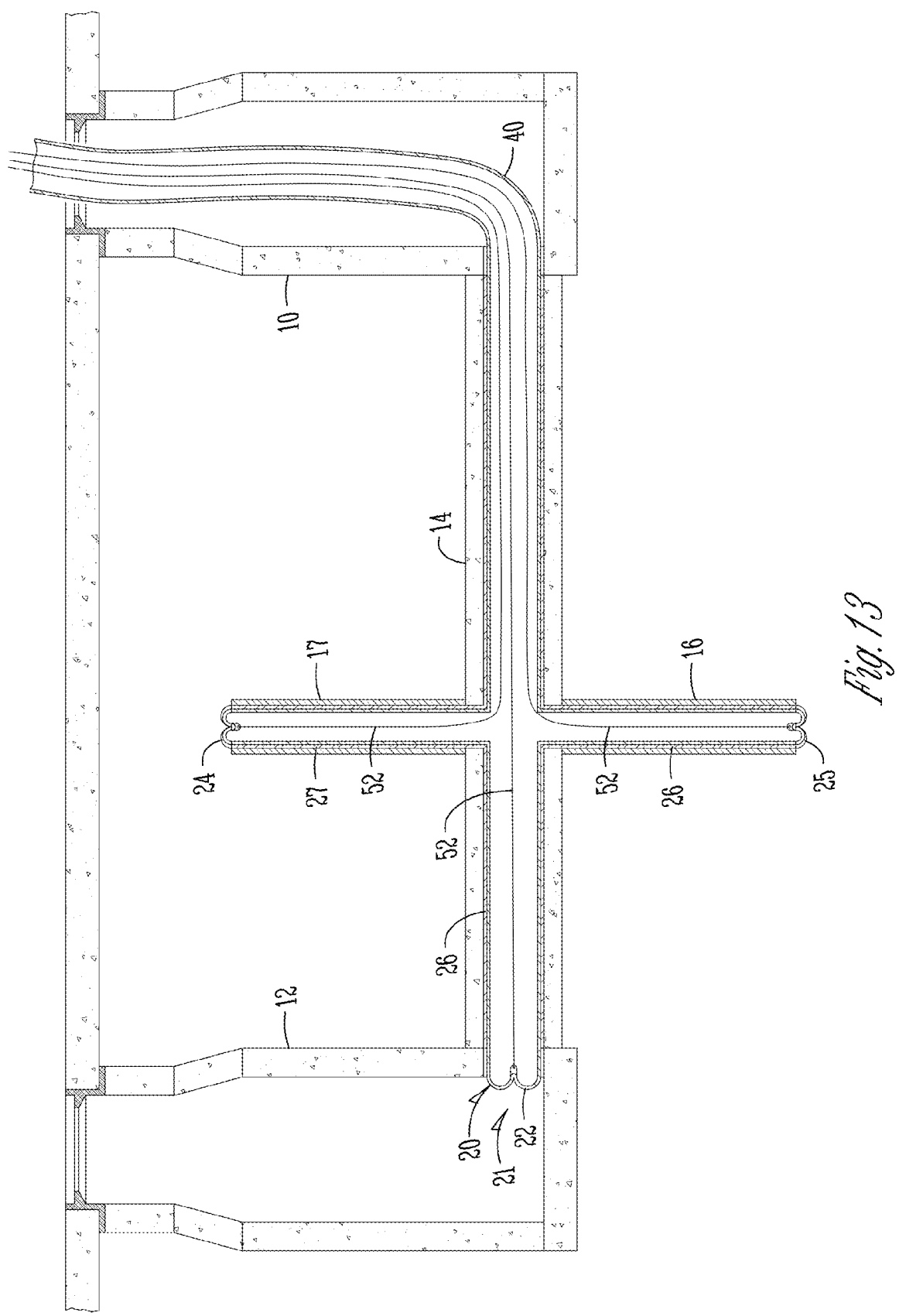
FIG. 13 is a sectional view of the pipe system with the repair assembly inflated therein.
Figure 14:
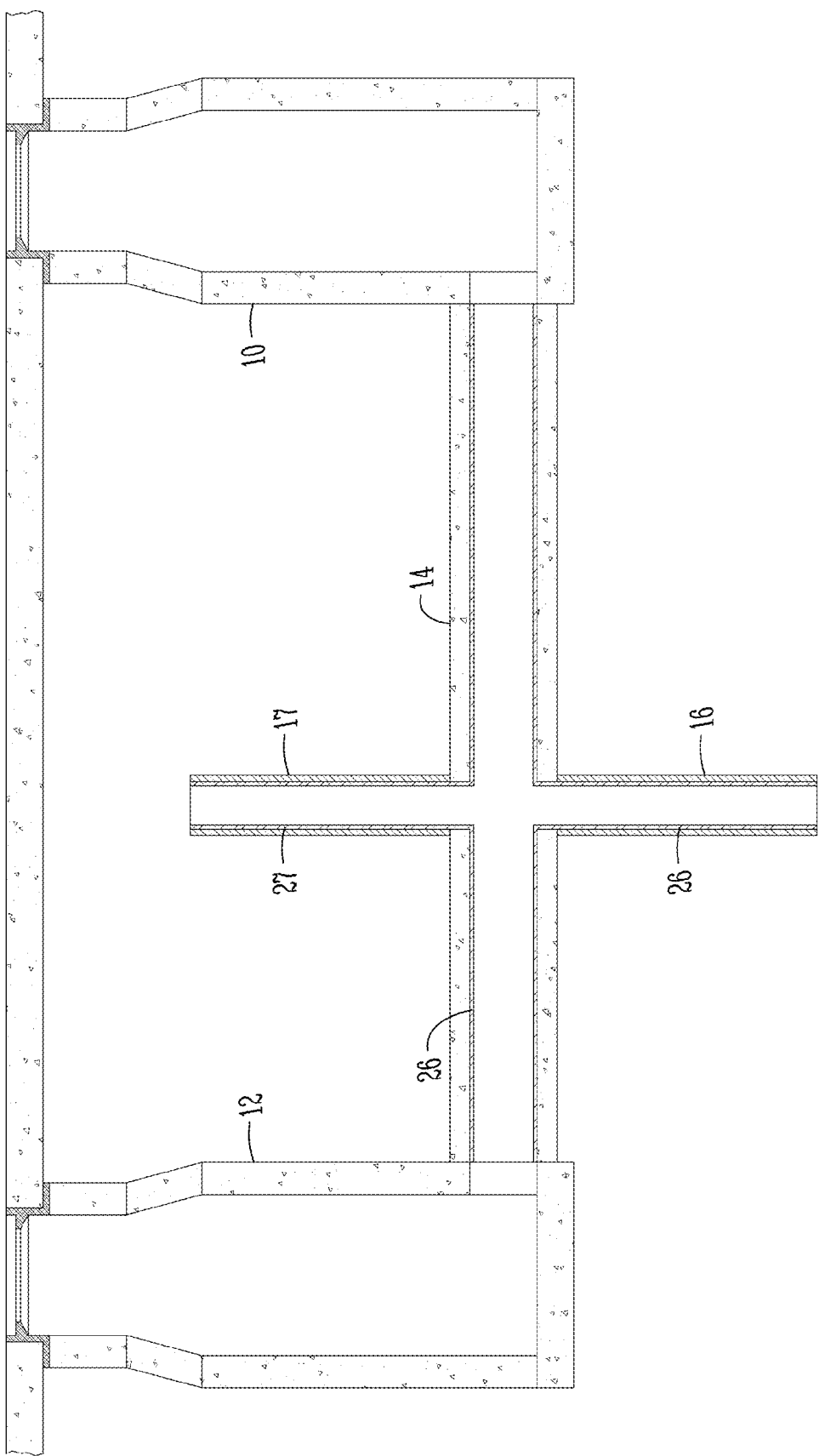
FIG. 14 is a sectional view of the pipe system with the liner left in place.

As is shown in FIGS. 12-14, the repair assembly 20 that has been attached to the launcher device 40 has been introduced with a fluid for expanding the bladder assembly 21 through the pipe system. The main bladder tube 22 is everted through the launcher device 40 (lay flat hose) and itself to position the main liner member or tube 26 from within the main bladder tube 22 to a position between the main bladder tube 22 and the main pipe 14. In addition, as the repair assembly 20 is expanded through the main pipe 14, a plurality of lateral bladder tubes 24, 25 have been attached to the main bladder tube 22 such that they are aligned at a pipe junction 19 with lateral pipes 27, 28. Therefore, as the repair assembly 20 reaches the pipe junction 19, additional inflation or expansion of the bladder assembly 21 will cause the aligned lateral bladder tubes 24, 25 to be inserted and everted into and through the lateral pipes 16, 17. As the lateral bladders 24, 25 are everted into the lateral pipes 16, 17 the eversion will cause the lateral liner tubes 27, 28 to evert from a position within the lateral bladder tubes to a position between the lateral bladder tubes and the lateral pipes.

The fluid pressure is maintained in the bladder assembly 21 until the full length of the liners of the liner assembly 30 have been everted, and then until the material impregnated therein has cured and hardened. Once the material impregnated in the liners of the assembly 30 has cured and hardened (while the bladders have maintained their expansion), the bladders can be deflated and removed from the system, such as by pulling on the ropes 52 attached to the closed ends thereof. FIG. 14 shows such a situation, which shows that the bladders have been removed, and what is left is the cured liners, which form the repaired walls of the pipes of the system.

Figure 16:
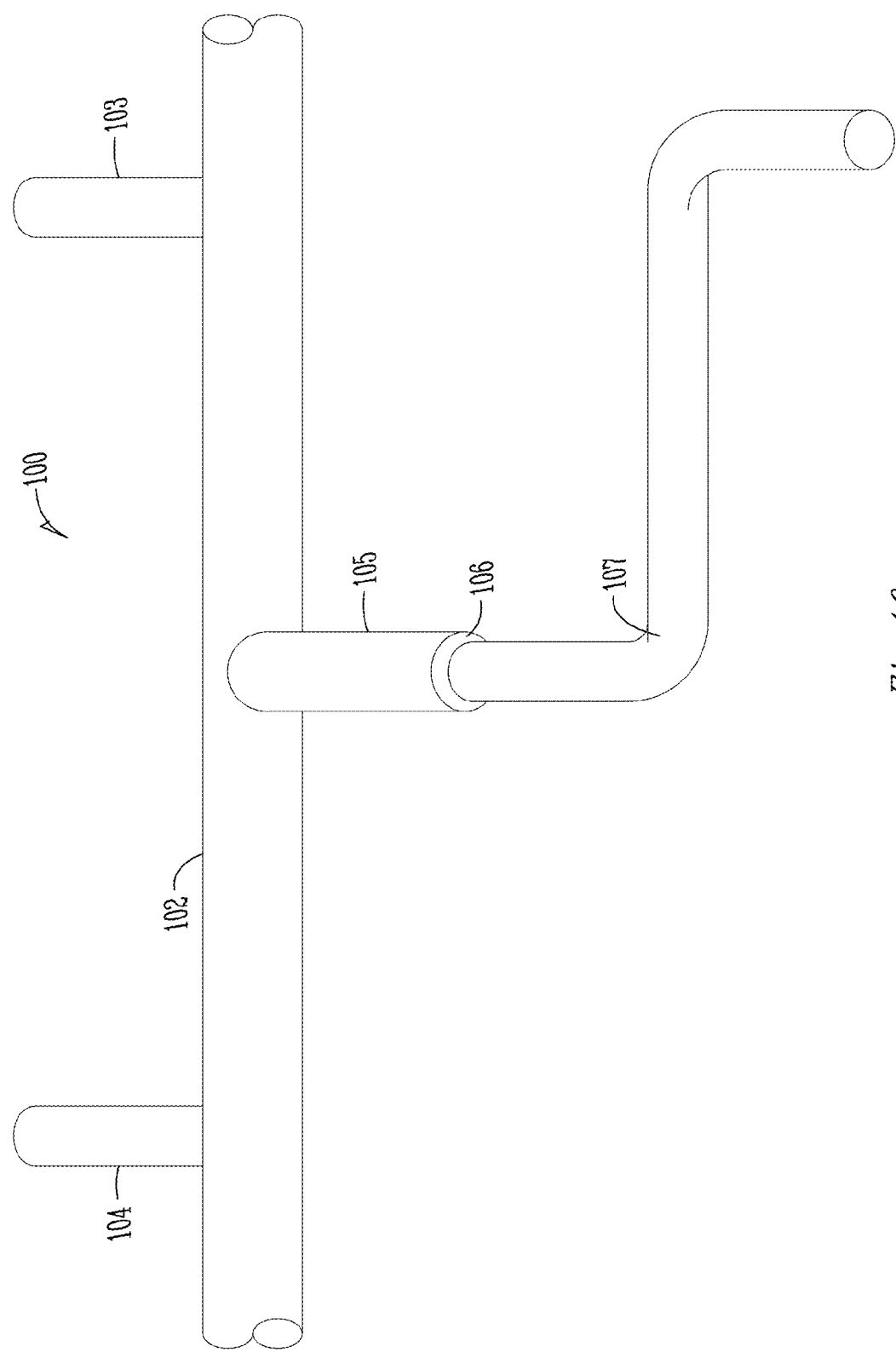
FIG. 16 is a view of another pipe system.

FIG. 16 shows yet another configuration of a pipe system 100, including a main pipe 102, and lateral pipes 103, 104, and 105. The lateral pipe 105 extending generally downwardly in FIG. 16 includes a juncture 106 comprising a change in diameter, as well as multiple bends 107.

Figure 17:
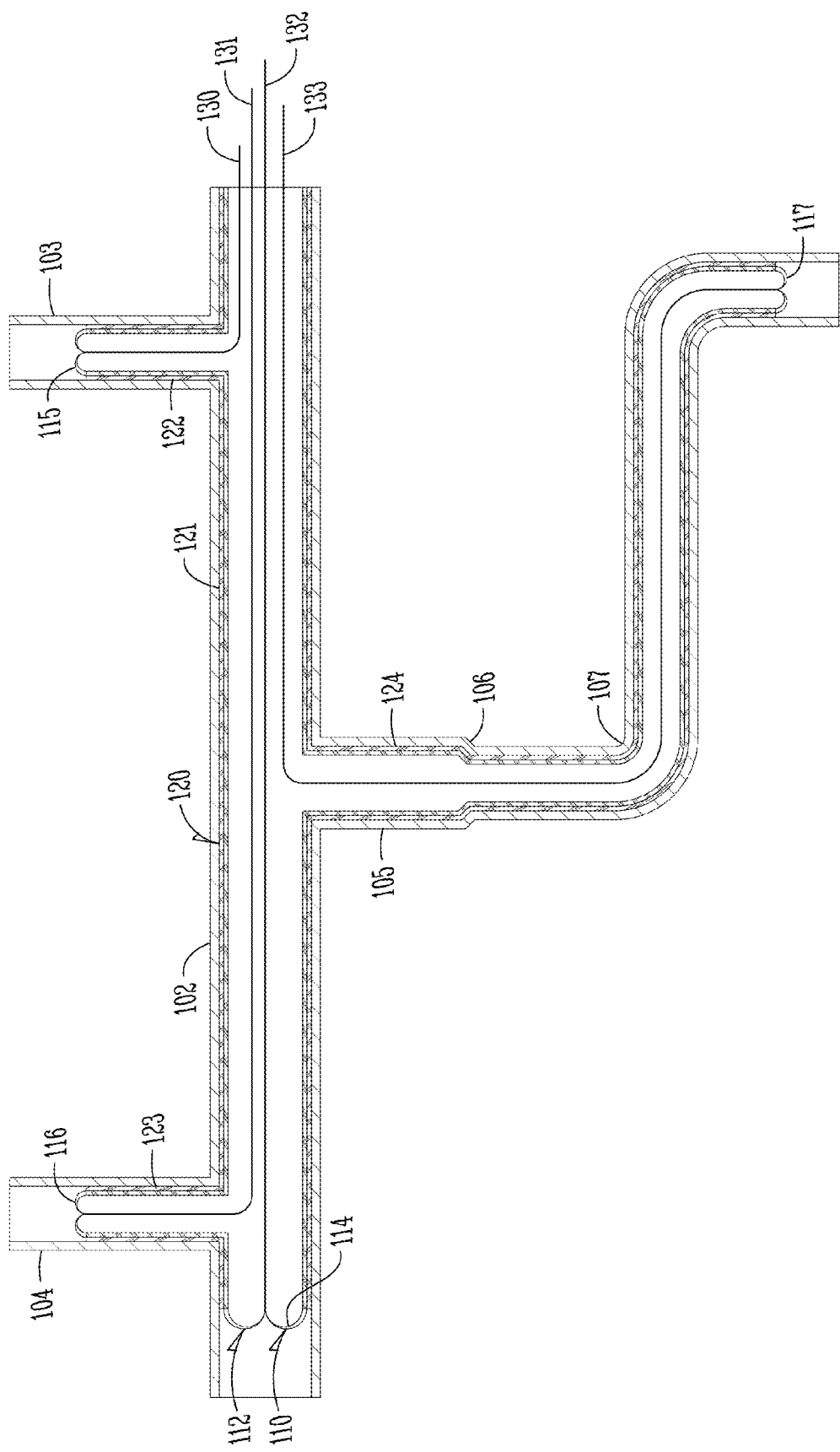
FIG. 17 is a sectional view of the pipe system of FIG. 16 with a liner assembly lining the pipes of the system.

FIG. 17 shows a repair assembly 110 capable of repairing such a pipe system 100, as shown in FIG. 16. The repair assembly 110 is shown in an everted position within the pipes of the system 100. For example, a bladder assembly 112 includes a main bladder tube 114, first lateral bladder tube 115, second lateral bladder tube 116, and a third lateral bladder tube 117. The lateral bladder tubes are fluidly connected to the main bladder tube, and are attached to and sized according to the angular connection and diameters of the lateral pipes of the pipe system. Therefore, the third lateral bladder tube 117 includes a first section and a second section each having separate diameters, to account for the juncture 106 in the lateral pipe 105 wherein the pipe changes diameter. This change in diameter, and the location thereof, could be predetermined such that the bladder is configured to match the structure of the pipe. In addition, the bladders comprise a material that is able to curve at the bends 107 of the pipe.

Each of the main and lateral bladders includes a closed end that is connected to a separate rope, cord, or other member. These are shown in FIG. 17, as the first rope 130 corresponds to the first lateral bladder 115, the second rope 131 corresponds to the second lateral bladder 116, the third rope 132 corresponds to the main bladder 114, and the fourth rope 133 corresponds to the third lateral bladder 117. The ropes will aid in the lining of the pipes, while also allowing the bladders to be removed after the repair is complete.

The repair assembly also includes a liner assembly 120, which comprises a main liner member 121, a first lateral liner tube 122, a second lateral liner tube 123, and a third lateral liner tube 124. The liner assembly 120, according to some aspects, comprises a resin absorbent material, and is impregnated with a material capable of curing and hardening, such as by the methods previously disclosed. The main liner member 121 may be a tube or a rolled sheet, and is capable of lining at least a portion of the main pipe 102. The third lateral liner tube 117 can be tailored to the configuration of the changing diameter pipe, or can comprise a single diameter, in which the liner has a diameter equal to or larger than the larger diameter section of pipe. The liner would be allowed to fold on itself at the smaller diameter section, while still providing a smooth interior wall formed by the curable material.

The pipe system 100 is first measured, such as by with a camera, digital video capture-measuring device, or other mechanism, to get the blueprint and/or configuration of the pipe. The amount of repair is determined, and a corresponding bladder assembly 112 and lining assembly 120 is made, in order to match the layout of the pipe system 100 and the repair configuration. To line the pipe, the lining assembly 120 is positioned at least partially within the bladder assembly 112, and a resin is impregnated into the lining assembly 120. The lateral members are inverted into the main members, and the main members are inverted through their selves and/or a launching device, such as a lay flat hose (not shown).

The repair assembly 110 is positioned at the pipe, and air or other fluids are added to the interior of the assembly. The main bladder and liner will begin to evert into and through the main pipe 102, where the main liner member 121 will move from a position within the main bladder 114 to a position between the bladder and the pipe. At the location of the first lateral pipe 103, the first lateral bladder and liner will evert from the main bladder/liner combination, such that the first lateral liner tube 122 will evert from within the first lateral tube 115 to between the bladder and the lateral pipe. At the location of the third lateral pipe 105, the third lateral bladder and liner will evert from the main bladder/liner combination, such that the third lateral liner tube 124 will evert from within the third lateral tube 115 to between the bladder and the lateral pipe. The third bladder/liner combination will continue to line the pipe, even after the change in the diameter of the pipe, such as that shown in FIG. 17, and will continue to line the pipe around the bends 107 of the pipe, such that the desired length of pipe is lined.

During the lining of the lateral pipes 103, 105, the main bladder and liner will continue to be everted through the main pipe 102. At the location of the second lateral pipe 104, the second lateral bladder and liner 116, 123 will evert from the main bladder/liner combination, such that the second lateral liner tube 123 will evert from within the first lateral tube 116 to between the bladder and the lateral pipe. The main liner 121 is shown to line a portion of the pipe extending beyond the last lateral pipe 104, where it reaches the end of the desired length of repair. The bladders will maintain their expansion until the material impregnated in the liners has cured and hardened. The lines 130, 131, 132, and 133 can then be pulled to remove the bladders from the pipe system. However, in some instances, the bladders may form a mechanical and/or chemical bond with the liners to stay within the pipe, thus forming the new wall. In such circumstances, the closed ends of the bladders can be cut open to reinstate access to the pipes.

Thus, as has been shown and described, the present invention provides a method and means for aligning an extended length of a main pipe as well as one or more lateral pipes extending from the main pipe at generally any angle and configuration. The lateral pipes are lined as the main pipe is being lined with an everting main liner. Thus, in at least some instances, the lining of the lateral pipes can be simultaneous or in a continuous manner as the main pipe lining by the everting main liner member. While some figures show a system where the lateral pipes extend at obtuse angles from the main pipe at generally the same radial configurations, it is to be understood that the present invention provides for repairing generally any configurations of a lateral pipe or pipes extending from the main pipe.

Furthermore, it is contemplated that the present invention may be utilized to repair an entire length of a main pipe extending from an upstream manhole to a downstream manhole, as well as any and all lateral pipes extending from said main pipe. In such a case, a panoramic robot may be first utilized to map out the configuration of the pipe system between the upstream and downstream service pipes or manholes. The robot can provide a two-dimensional layout for the pipe system. As such, a repair assembly 20, including a bladder assembly and liner assembly can be prepared to match the length and configuration of the main and lateral pipe(s) between the two service pipes. For example, the length of the main bladder and liner(s) can be determined to ensure that the full length of main pipe between the service pipes is repaired. Furthermore, the number and configuration of lateral pipes, which may be one or more, extending from the main pipe can be determined such that the lateral bladder(s) and liner(s) can be attached to the main bladder and liner at the appropriate position(s) along the length of the repair assembly 20, as well as at the appropriate angle relative to the axis of the main pipe. Thus, it is contemplated that the one or more lateral pipes being repaired at the same time as the main pipe may be at various angles and radial configurations relative to the axis of the main pipe.

Furthermore, a rope may be attached to each of the ends of each of the lateral bladders as well as the main bladder to be repaired along the full length of the main pipe. The use of the ropes will provide multiple benefits. The length of the ropes can be determined such that the operator can be sure that the full or desired length of the lateral pipe(s) has been repaired with the lateral bladder and liner combination. Furthermore, the ropes can be used to remove the bladders from the main and lateral pipe(s) once the material impregnated into the liner assembly has cured and hardened within the pipes.

The present invention provides numerous benefits and advantages over prior methods and systems for repairing pipe systems. For example, as has been understood, the ability to repair an extended section of main pipe along with one or more lateral pipes at the same time and using the same assembly will greatly reduce the cost and time for repairing a pipe system. Heretofore, it has been known to repair each lateral pipe individually, and then repairing the main pipe. Thus, the present invention will reduce the time for repairing each lateral pipe individually, and also reduce the possibility of blockages created by obstructions due to the overlapping layers of the liners due to the individual lining of the lateral and main pipes. Furthermore, as the system can be custom tailored to match a section of main pipe and the one or more lateral pipes extending therefrom, the system removes the use of a launcher device at each juncture between a main and lateral pipe. Removing the need for a launcher device can increase the alignment of the lateral bladder and liner with the lateral pipe as the main bladder is expanding through the main pipe. Furthermore, as the main liner member may be frangibly attached to the main bladder prior to expansion of the system, the accuracy of the system and reduction of rotation during expansion may also be increased. The frangible connection can be easily overcome when removing the bladder from the pipe system.

As has been discussed, numerous variations, adjustments, substitutions, and the like may be incorporated into the method and means of aligning the pipe according to the present invention. For example, the removal of the bladder assembly may be utilized when a liner assembly includes a fluid impermeable coating on one side thereof. Furthermore, the lay flat hose launcher device may not be needed in all embodiments, as the bladder can be simply folded over itself and connected to a fluid providing means. Various means of aligning or steering the assembly as it is expanded through the main and lateral pipes may also be utilized. For example, a steering assembly may be utilized at the expansion end of the assembly and used with a reference marker to ensure that the assembly is aligned as it is expanded through the main pipe. In addition, a robot and steering device may be incorporated through the downstream service pipe such that it is able to steer the inverting end of the assembly as it is expanded through the pipe as well.

In addition, it is contemplated that additional components be added to the repair assemblies of the aspects of the invention. For example, sealing members, such as O-rings, hydrophilic bands or rings, or other members may be used. O-rings, single or plural, may be positioned at the ends of each lateral liner tube, as well as at both ends of the main liner member, in order to aid in sealing from water. The O-rings may comprise a hydrophilic material, which swells under the presence of water. Other hydrophilic sealing members could be positioned at the junctures between the main and lateral liners to aid in sealing said junctures as the repair assembly is everted through the main pipe and into the lateral pipes.

It should be understood that additional changes and modifications to the embodiments shown and described herein will be apparent to those skilled in the art. Such changes and modifications may be made without departing from the spirit and scope of the invention, and without diminishing its advantages. It is intended, therefore, that such changes and modifications be covered by the embodiments of the invention.

What is claimed is:

1. A method of repairing pipes including a main pipe extending between a first and second manhole and one or more lateral pipes extending from the main pipe, the method comprising:
   providing a liner assembly comprising a main liner member and one or more lateral liner tubes extending from the main liner member and capable of everting from within the main liner member to a position in one of the one or more lateral pipes;
   impregnating the liner assembly with a material capable of curing and hardening;
   everting the main liner member within the main pipe while simultaneously or continuously everting at least one of the one or more lateral liner tubes into one of the one or more lateral pipes; and
   allowing the material to cure and harden.

2. The method of claim 1 further comprising providing a bladder assembly comprising a main bladder tube and one or more lateral bladder tubes extending from the main bladder tube, wherein the main bladder tube is inflated to evert, and wherein the one or more lateral bladder tubes are movable from a position within the main bladder tube to an everted position outside the main bladder tube.

3. The method of claim 2 wherein the main liner member is positioned at least partially within the main bladder tube and everts to a position at least partially surrounding the main bladder tube between the main bladder tube and the main pipe.

4. The method of claim 3 further comprising removing the bladder assembly from the main and lateral pipes after the material has cured and hardened.

5. The method of claim 1 wherein the liner assembly is everted from the first manhole and towards the second manhole such that the main liner member is positioned against the main pipe and the one or more lateral liner tubes are positioned within the one or more lateral pipes.

6. The method of claim 1 wherein the liner assembly is everted at a distance from the first manhole and towards the second manhole.

7. The method of claim 1 wherein the liner assembly comprises a lateral liner for each of the one or more lateral pipes between the first and second manholes, and wherein each of the lateral pipes and the main pipe are lined by the liner assembly.

8. The method of claim 7 further comprising lining all of the lateral pipes in a continuous or simultaneous manner as the main liner member is everted.

9. A repair assembly for repairing at least a portion of a main pipe between a first and second manhole, as well as one or more lateral pipes extending from the main pipe, comprising:

a bladder assembly comprising a main bladder tube and one or more lateral bladder tubes extending from the main bladder tube to coincide with the one or more lateral pipes;

the one or more lateral bladder tubes capable of everting from a position at least partially within the main bladder to a position at least partially outside the main bladder;

a liner assembly comprising a main liner member capable of everting within the main pipe and one or more lateral liner tubes extending from the main liner member, each lateral liner tube capable of everting from within the main liner member to a position within one of the one or more lateral pipes;

wherein the main liner member is moveable between a position at least partially within the main bladder tube to a position at least partially outside the main bladder tube; and wherein the main and lateral liners comprise a resin absorbent material.

10. The repair assembly of claim 9 wherein the bladder assembly is operatively attached to an inflation source.

11. The repair assembly of claim 9 further comprising a launcher device operably attached to the main bladder tube to inflate the bladder assembly through the main pipe and into the lateral pipes.

12. The repair assembly of claim 9 wherein the one or more lateral liner tubes extend from a single, common main liner member.

13. The repair assembly of claim 12 wherein each of the lateral liner tubes are fluidly connected to the main liner member at liner junctures.

14. The repair assembly of claim 9 wherein the one or more lateral bladder tubes extend from a single, common main bladder tube.

15. A method of repairing pipes including at least a portion of a main pipe extending between a first and second manhole and one or more lateral pipes extending from the main pipe, the method comprising:

providing a bladder assembly comprising a main bladder tube and one or more lateral bladder tubes extending from the main bladder tube;

providing a liner assembly comprising a main liner member and one or more lateral liner tubes extending from the main liner member, the liner assembly capable of everting from within the main bladder tube;

impregnating the liner assembly with a material capable of curing and hardening;

inflating the bladder assembly to evert the main liner member from within the main bladder tube to a location within the main pipe that is between the main bladder tube and the main pipe;

wherein the one or more lateral bladder tubes and lateral liner tubes evert into the one or more lateral pipes with the lateral liner tubes between the lateral bladder tubes and the lateral pipes as the bladder assembly is inflated; and allowing the material to cure and harden.

16. The method of claim 15 further comprising removing the bladder assembly from the main and lateral pipes after the material has cured and hardened.

17. The method of claim 15 further comprising everting the main bladder tube and main liner member from the first manhole and towards the second manhole to repair at least a portion of the main pipe.

18. The method of claim 15 wherein two lateral pipes are lined and repaired at the same time of repairing the main pipe.

19. The method of claim 15 wherein the step of inflating the bladder assembly everts the main bladder tube from a launcher device near the first manhole.

20. The method of claim 15 further comprising lining all of the lateral pipes in a continuous manner as the bladder assembly is inflated.

* * * * *